(12) United States Patent
Hu et al.

(10) Patent No.: US 11,115,542 B2
(45) Date of Patent: Sep. 7, 2021

(54) PAIR-THE-PLAN SYSTEM FOR DEVICES AND METHOD OF USE

(71) Applicant: Aeris Communications, Inc., San Jose, CA (US)

(72) Inventors: David Hu, Sunnyvale, CA (US); Drew S. Johnson, San Jose, CA (US); Robert B. Fultz, Boulder Creek, CA (US); Steven A. Millstein, Dallas, TX (US); Dae Seong Kim, Campbell, CA (US); John Molise, Menlo Park, CA (US)

(73) Assignee: Aeris Communications, Inc., San Jose, CA (US)

( * ) Notice: Subject to any disclaimer, the term of this patent is extended or adjusted under 35 U.S.C. 154(b) by 0 days.

(21) Appl. No.: 16/819,398

(22) Filed: Mar. 16, 2020

(65) Prior Publication Data

US 2020/0220983 A1    Jul. 9, 2020

Related U.S. Application Data

(63) Continuation-in-part of application No. 15/599,835, filed on May 19, 2017, which is a continuation of
(Continued)

(51) Int. Cl.
*H04M 15/00* (2006.01)
*H04W 4/90* (2018.01)
(Continued)

(52) U.S. Cl.
CPC .... *H04M 15/7652* (2013.01); *H04L 12/1457* (2013.01); *H04L 12/1471* (2013.01);
(Continued)

(58) Field of Classification Search
CPC ............. H04M 15/7652; H04M 15/60; H04M 15/745; H04M 15/765; H04W 4/44; H04W 4/24; H04L 12/1457; H04L 12/1471
(Continued)

(56) References Cited

U.S. PATENT DOCUMENTS 6,195,568 B1    2/2001  Irvin
9,667,806 B2    5/2017  Johnson
(Continued)

OTHER PUBLICATIONS

PCT International Search Report and Written Opinion of the International Searching Authority, dated Jan. 21, 2015, application No. PCT/US2014/060748.

*Primary Examiner* — Nghi H Ly
(74) *Attorney, Agent, or Firm* — Brundidge & Stanger, P.C.

(57) ABSTRACT

A computer-implemented method and system are disclosed for connecting a device to subscriptions and cellular billing plans. The method includes enrolling a second device enabled for connectivity to cellular or other wireless service in a cellular subscription and associated billing plan associated with a first device, wherein the enrollment includes providing an identifier for the second device to a cellular service provider associated with the first device by a second user, and allowing a second user to use capabilities of the second device as governed by the cellular subscription and an associated billing plan associated with the first device; while the second device is also configured to allow a first user to use capabilities of the second device as governed by the cellular subscription and an associated billing plan of the first user's choice.

24 Claims, 19 Drawing Sheets

Related U.S. Application Data application No. 14/274,505, filed on May 9, 2014, now Pat. No. 9,667,806.

(60) Provisional application No. 61/893,055, filed on Oct. 18, 2013.

(51) Int. Cl.
  *H04W 4/44* (2018.01)
  *H04W 4/24* (2018.01)
  *H04L 12/14* (2006.01)

(52) U.S. Cl.
  CPC ......... *H04M 15/60* (2013.01); *H04M 15/745* (2013.01); *H04M 15/765* (2013.01); *H04W 4/24* (2013.01); *H04W 4/44* (2018.02); *H04W 4/90* (2018.02)

(58) Field of Classification Search
  USPC ........................... 455/406, 414.1, 418, 422.1
  See application file for complete search history.

(56) References Cited

U.S. PATENT DOCUMENTS

| | | |
|---|---|---|
| 2008/0274715 A1 | 11/2008 | Heit |
| 2010/0131385 A1 | 5/2010 | Harrang |
| 2010/0234071 A1 | 9/2010 | Shabtay et al. |
| 2012/0046024 A1* | 2/2012 | Mikan ............... H04M 15/8351 455/420 |
| 2012/0088544 A1 | 4/2012 | Bentley |
| 2012/0142367 A1 | 6/2012 | Przybylski |
| 2013/0226682 A1 | 8/2013 | Grossman |
| 2013/0262275 A1 | 10/2013 | Outwater |
| 2013/0336637 A1* | 12/2013 | Nakamura ............. H04N 5/783 386/262 |
| 2014/0322294 A1 | 1/2014 | Donlan et al. |

\* cited by examiner

A Multipurpose Device Connected To Multiple Service Providers
If multiple profiles can be active at the same time

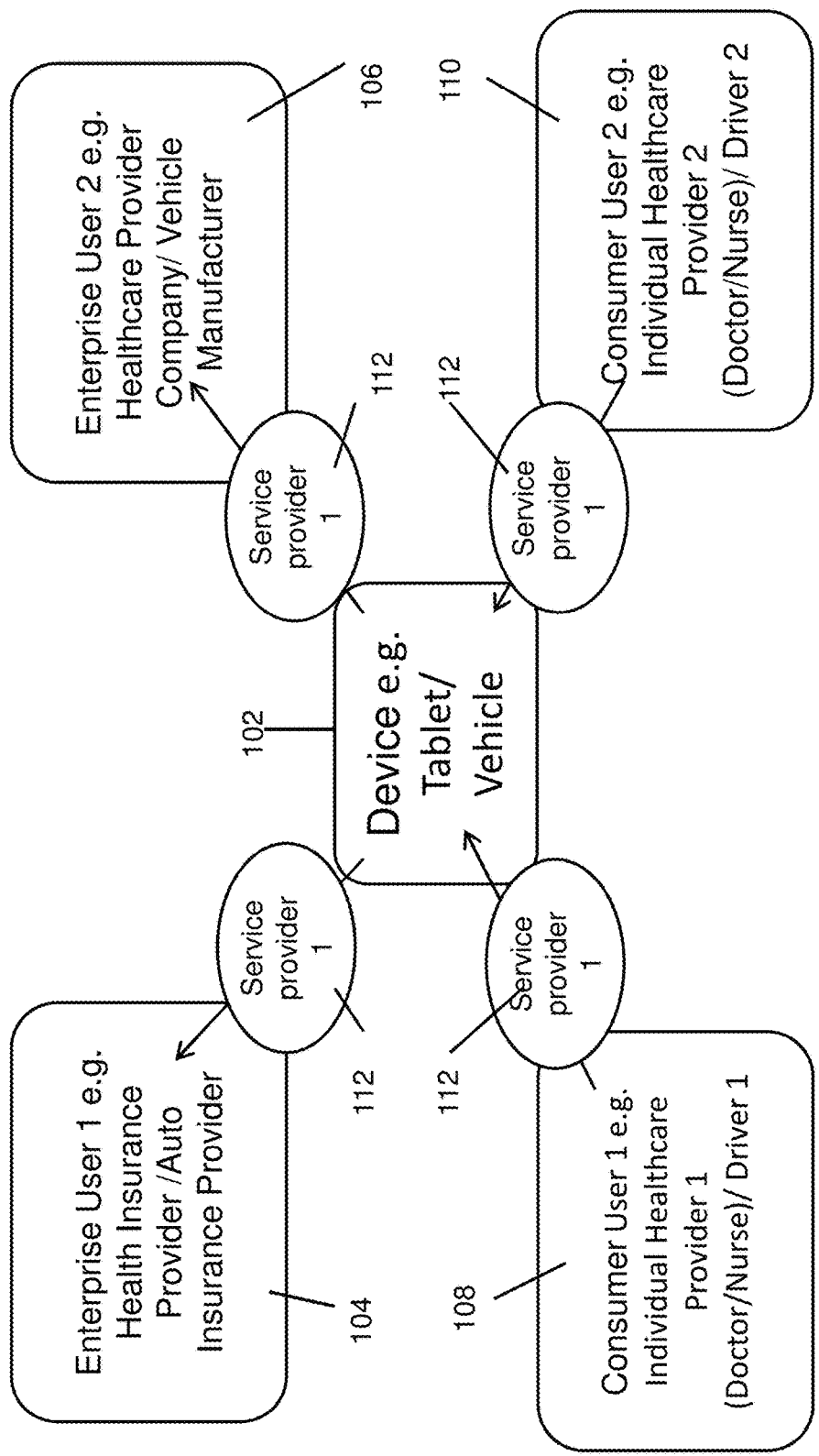

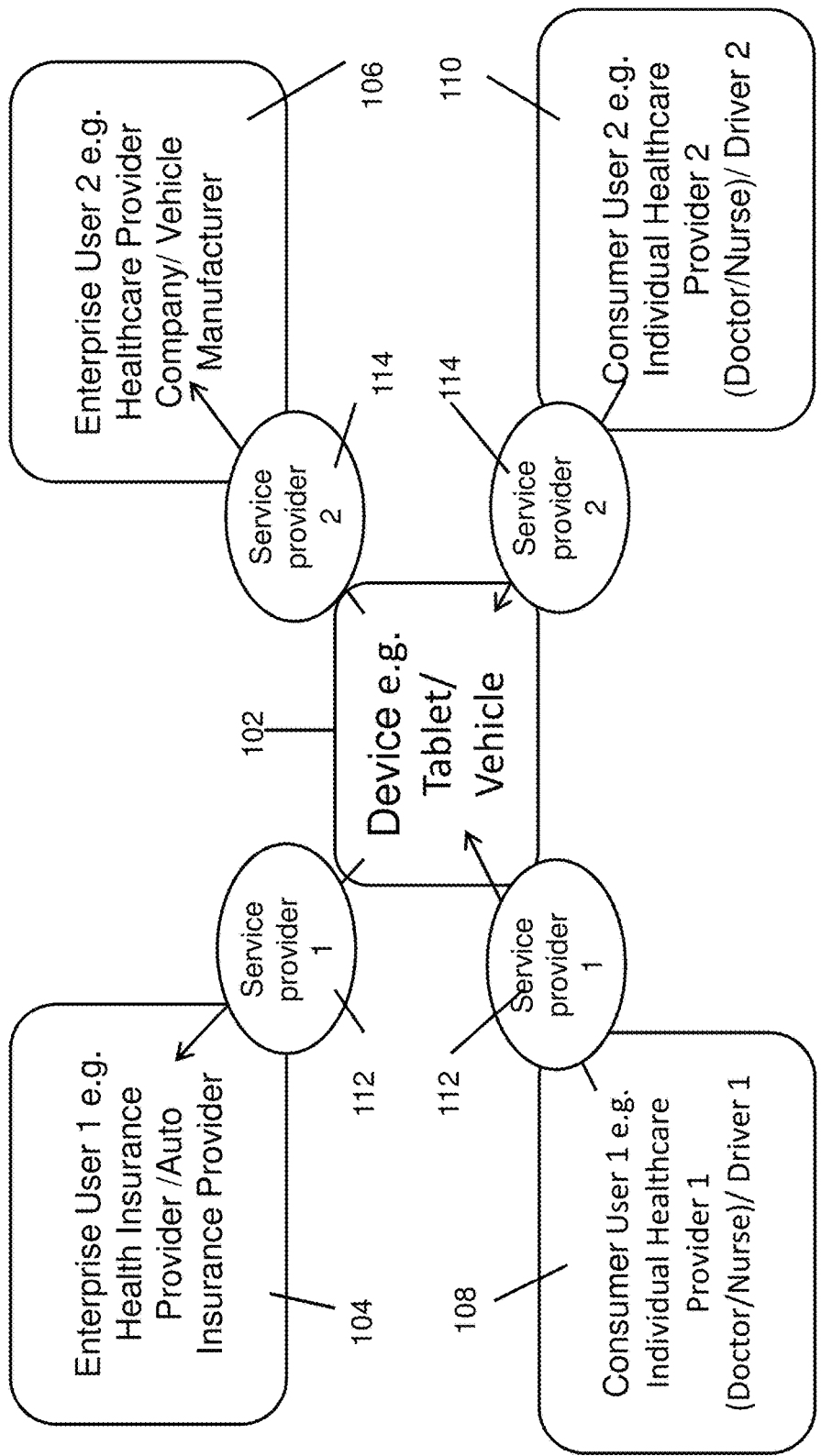

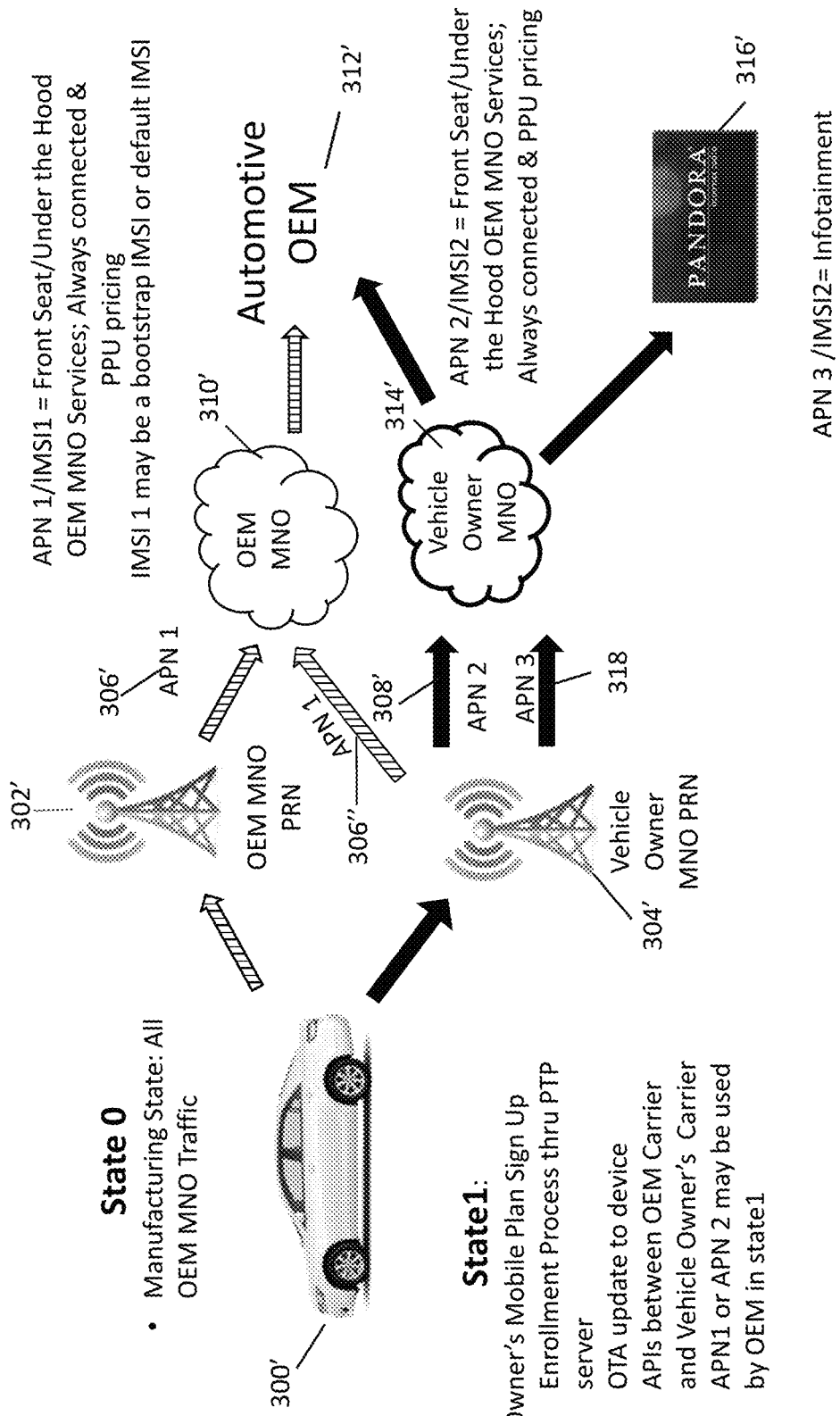

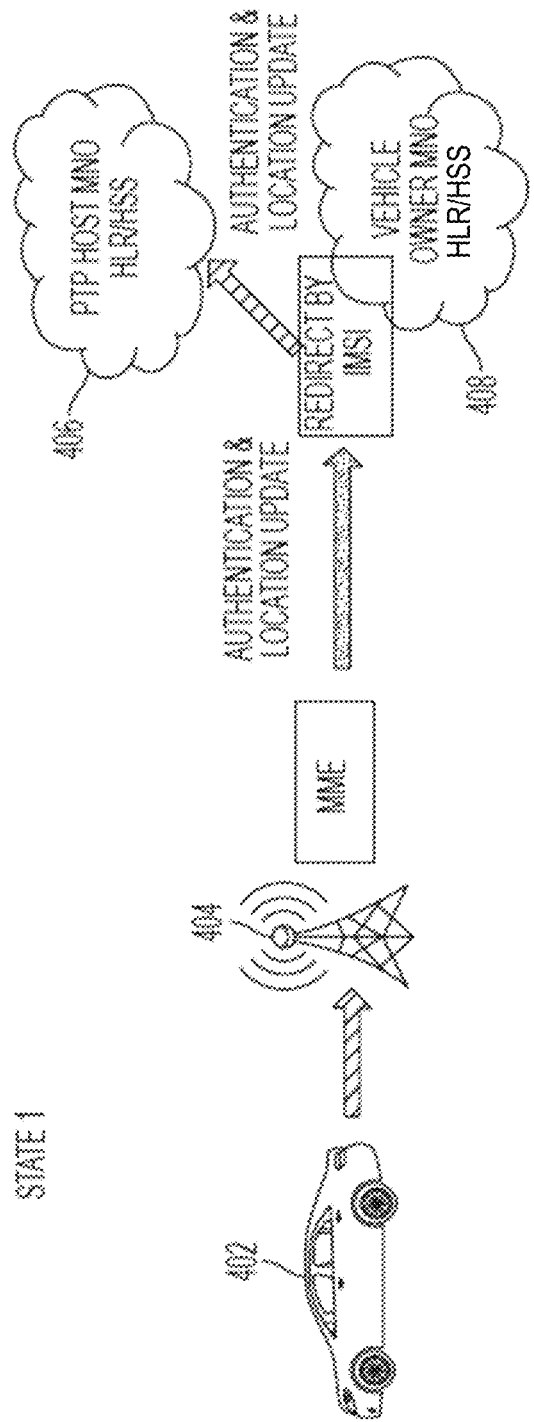

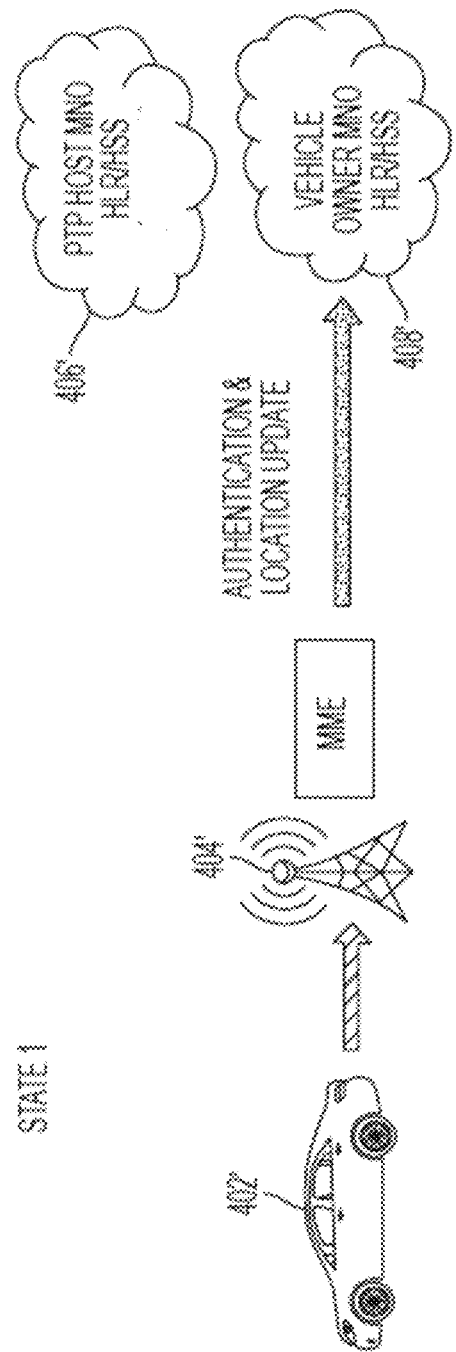

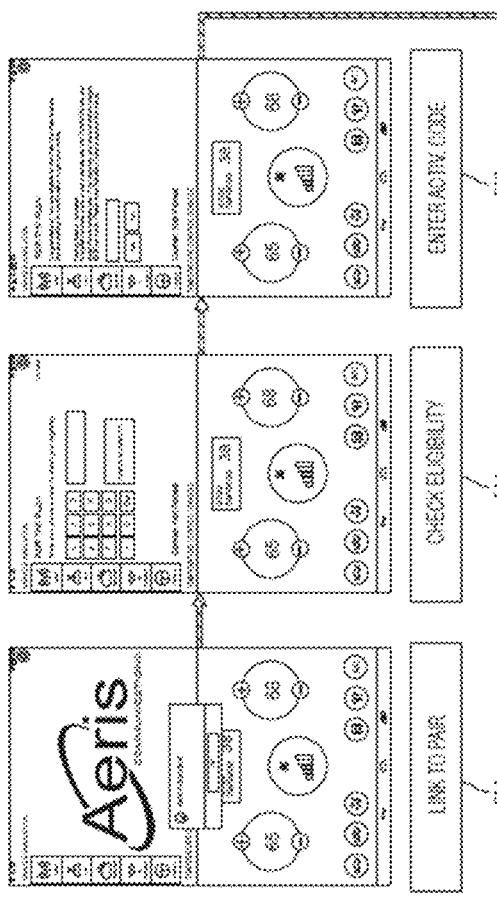
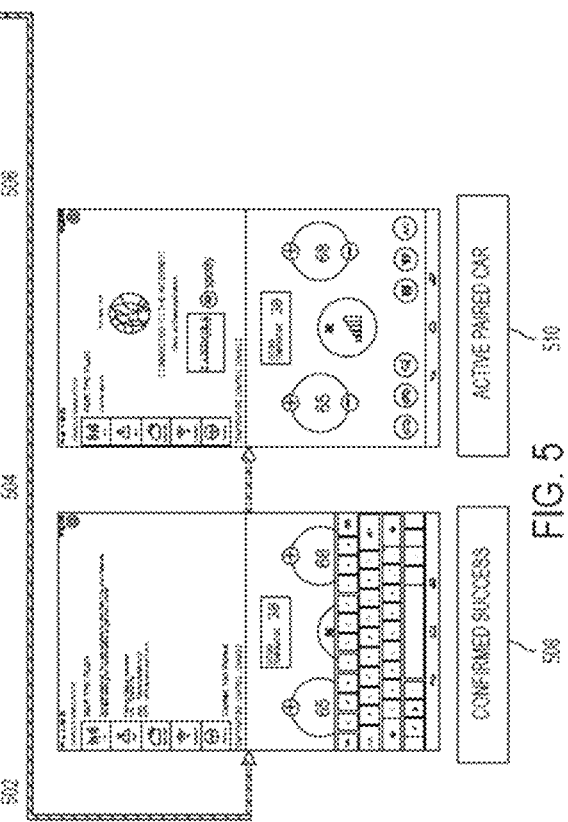
FIG. 5

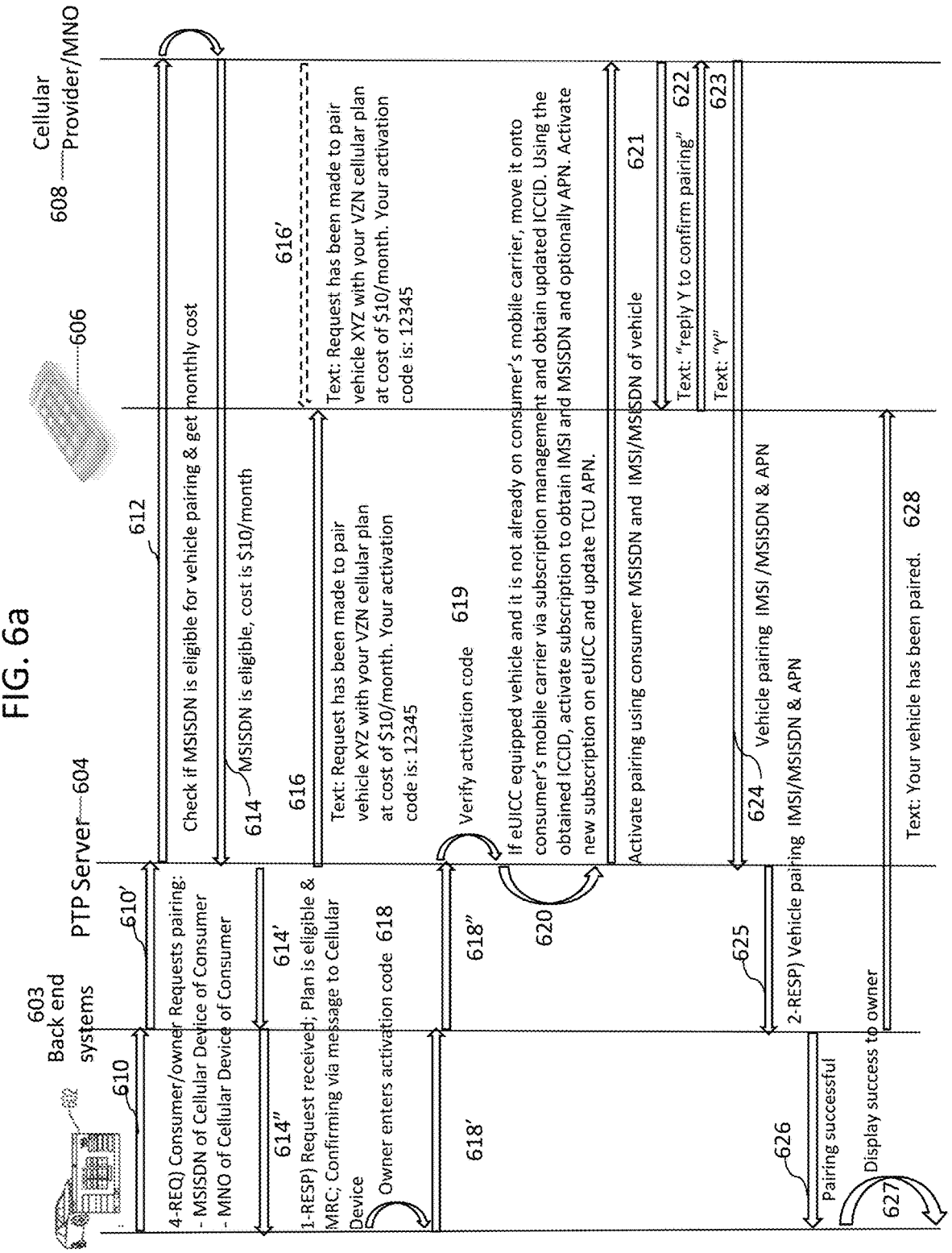

Application Access

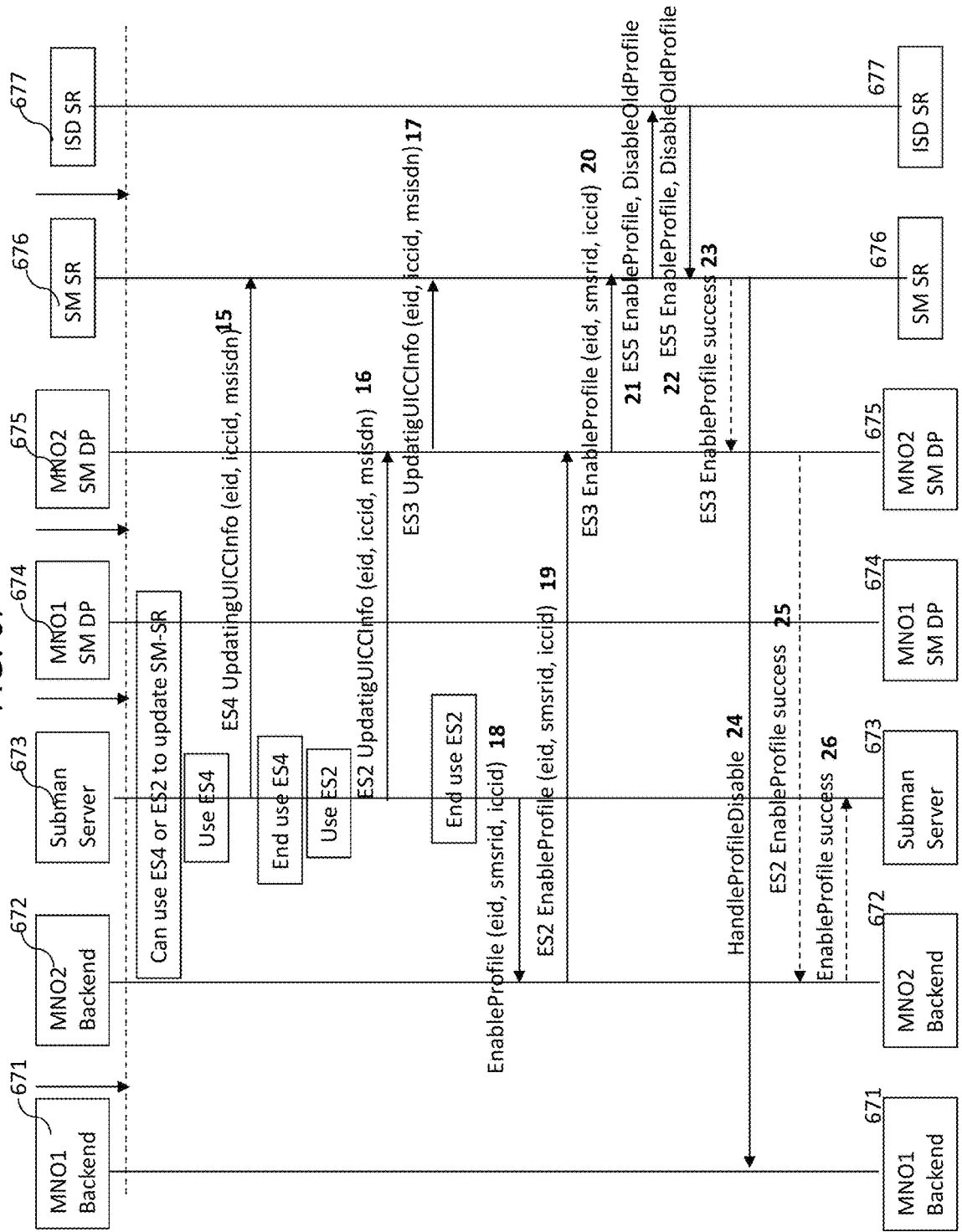

Post-Pairing – 4G Simultaneous Access

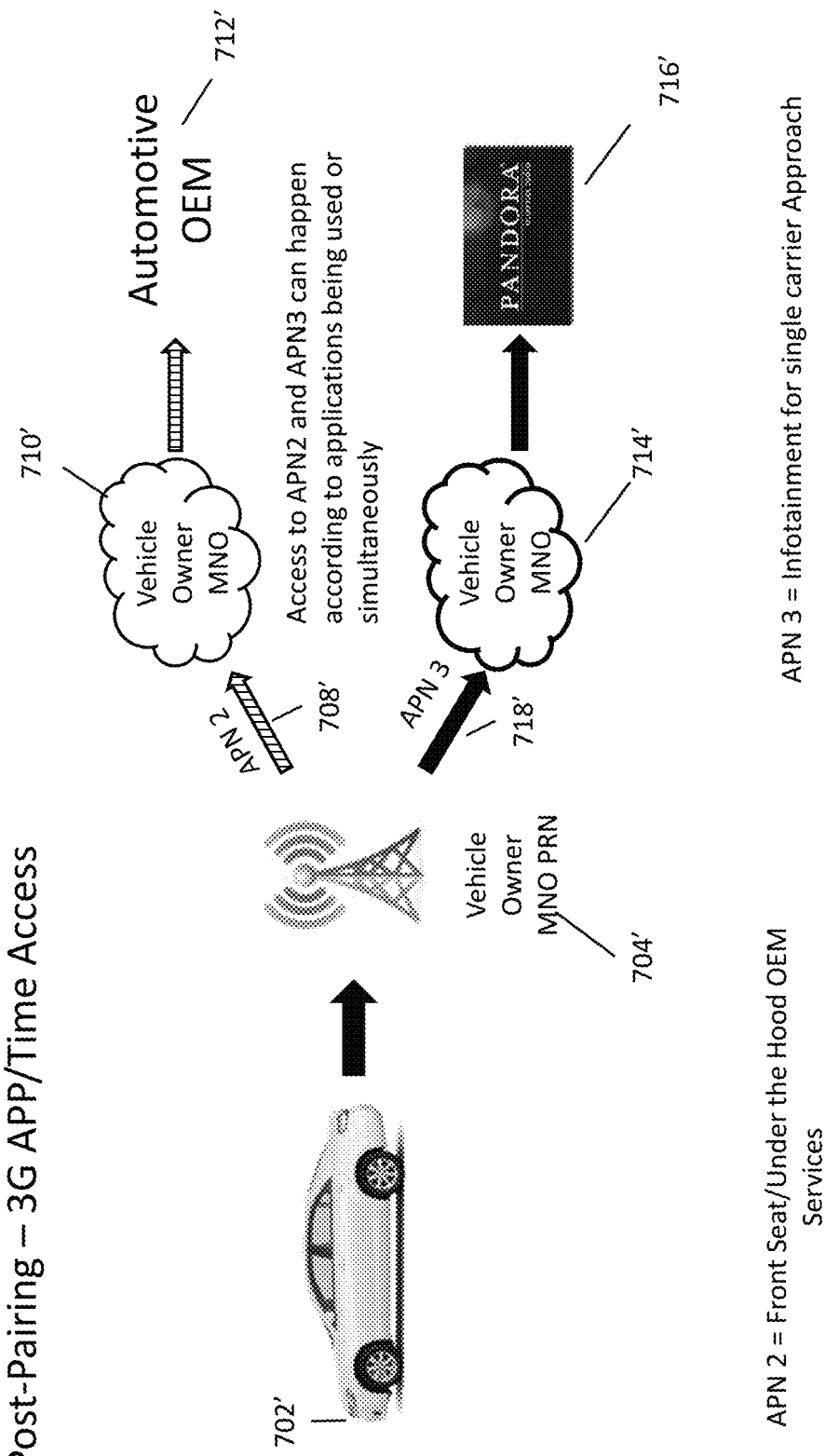

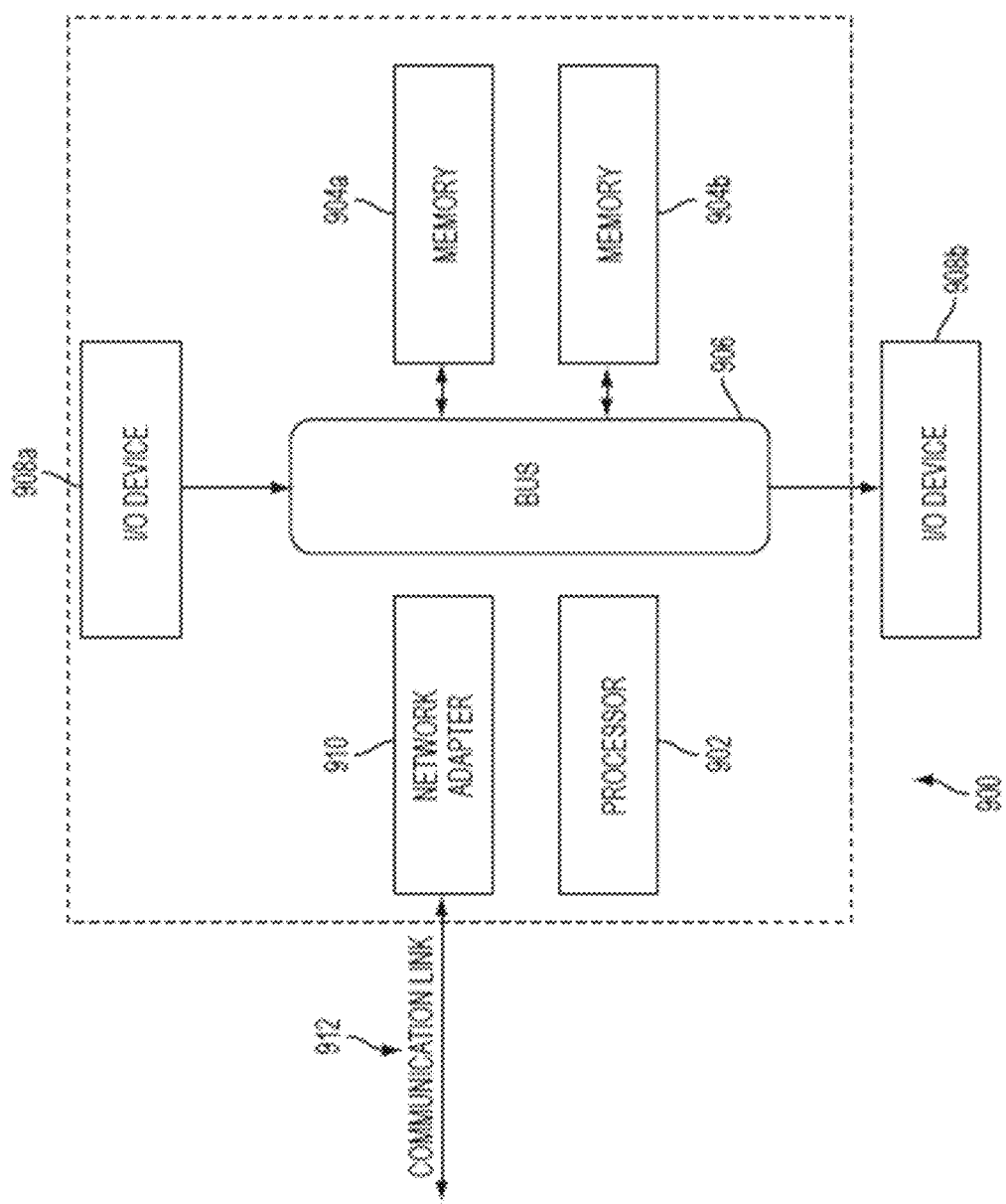

PAIR-THE-PLAN SYSTEM FOR DEVICES AND METHOD OF USE

CROSS-REFERENCE TO RELATED APPLICATIONS

This application is a Continuation-in-part of the U.S. application Ser. No. 15/599,835 filed on May 19, 2017, which is a Continuation of the U.S. application Ser. No. 14/274,505, filed on May 9, 2014; which claims priority to U.S. provisional application Ser. No. 61/893,055, filed on Oct. 18, 2013, the entire contents of all of which are hereby incorporated by reference.

FIELD OF THE INVENTION

The present invention relates generally to wireless services and more particularly to devices enabled for connectivity to cellular or other wireless service and having more than one primary purpose and user.

BACKGROUND

There are many types of devices that are enabled for connectivity to cellular or other wireless services and that can fulfill multiple purposes. One example is a vehicle with cellular connectivity; the vehicle Original Equipment Manufacturer (OEM) may enable this connectivity in the vehicle principally for the purpose of collecting data from the vehicle related to vehicle performance. At the same time, the connectivity could have other purposes, such as delivering information/entertainment (infotainment) content according to the preferences of the consumer using the vehicle (such as an owner, lessee or renter, referred to here for convenience as the "vehicle owner"), or allowing an insurance company to collect information about driving habits in order to offer discounts for those who drive safely. In the example for infotainment, vehicle owners would probably not be willing to fund the cellular connectivity for the OEM to collect data from the vehicle related to vehicle performance. Similarly, OEMs would probably not fund the cellular connectivity for vehicle owner's access to infotainment or other data-intensive applications.

Another example of such a device is a tablet (e.g. Kindle Fire™) which may be used to purchase and download content from a primary provider (e.g. Amazon). The content provider for the tablet (referred to for convenience as "the tablet content provider") benefits from such purchases and therefore is willing to fund the connectivity as part of that purchase. However, the tablet can also be used by the person using the tablet (referred to here for convenience as the "tablet owner") to access other content which is not provided by the tablet content provider, and the tablet content provider may prefer not to fund the cellular connectivity for this other content accessed by the tablet owner. As connectivity to cellular and other wireless services is not free, it is desirable to separate the cost and control of the connectivity depending on the user, directing traffic to the appropriate user's service provider and subscription and billing plan.

Accordingly, what are needed are systems and methods to address the above identified issues. The present invention addresses such a need.

SUMMARY

A computer-implemented method and system are disclosed for connecting a device to a subscription and cellular billing plan of a user. The method includes enrolling a second device enabled for connectivity to cellular or other wireless service in a cellular subscription and associated billing plan associated with a first device, wherein the enrollment includes providing an identifier for the second device to a cellular service provider associated with the first device by a second user, effectively adding the second device to the cellular subscription and associated billing plan associated with the first device; and allowing a second user to use capabilities of the second device as governed by the cellular subscription and an associated billing plan associated with the first device; while the second device is also configured to allow a first user to use capabilities of the second device as governed by the cellular subscription and an associated billing plan of the first user's choice.

The computer-implemented system includes a first device, a second device and a cellular service provider enrollment server enabled for enrollment of one or more devices, the server including a processor and a memory in communication with the processor, wherein the server receives an identifier for the second device to the cellular service provider associated with the first device, effectively adding the second device to the cellular subscription and associated billing plan associated with the first device, and enrolls the second device enabled for connectivity to cellular or other wireless service in a cellular subscription and associated billing plan associated with a first device; wherein a second user is allowed to use capabilities of the second device as governed by the cellular subscription and an associated billing plan associated with the first device; and wherein the second device is also configured to allow a first user to use capabilities of the second device as governed by the cellular subscription and an associated billing plan of the first user's choice.

In an embodiment, a non-transitory computer-readable medium is disclosed. The non-transitory computer-readable medium has executable instructions stored therein that, when executed, cause one or more processors corresponding to a system having a first device, a second device and a cellular service provider enrollment server enabled for enrollment of one or more devices. The server includes a processor, a memory in communication with the processor and a user interface, to perform operations including enrolling a second device enabled for connectivity to cellular or other wireless service in a cellular subscription and associated billing plan associated with a first device, wherein the enrollment includes providing an identifier for the second device to a cellular service provider associated with the first device by a second user, effectively adding the second device to the cellular subscription and associated billing plan associated with the first device; and allowing a second user to use capabilities of the second device as governed by the cellular subscription and an associated billing plan associated with the first device; while the second device is also configured to allow a first user to use capabilities of the second device as governed by the cellular subscription and an associated billing plan of the first user's choice.

BRIEF DESCRIPTION OF THE DRAWINGS

FIGS. 1a, 1b and 1c illustrate a tablet or a vehicle environment with multiple users using single, double and multiple subscription plans in accordance with one or more embodiments.

FIGS. 3a and 3b are diagrams illustrating exemplary systems in which a device (in this case, a vehicle) would operate in accordance with one or more embodiments.

FIGS. 4a and 4b illustrate management of network registrations and authorizations through different channels of communication post-pairing, in accordance with one or more embodiments of the present invention.

FIG. 5 illustrates a series of display screens depicting an example of a vehicle pairing experience by a vehicle owner.

FIG. 6a is a process flow diagram illustrating one way in which the multiple-purpose device (in this case, in a vehicle) can be paired to cellular device subscription of the consumer using the solution embedded in the device.

FIGS. 6e and 6f illustrate an exemplary process for over the air subscription management.

FIG. 7b illustrates alternate access through Access Point Name 2 (APN2) and Access Point Name 3 (APN3) via a third generation (3G) cellular systems network.

FIG. 9 illustrates a data processing system 900 suitable for storing the computer program product and/or executing program code relating to the choices of the users in accordance with an embodiment of the present invention.

DETAILED DESCRIPTION

Figure 1A:
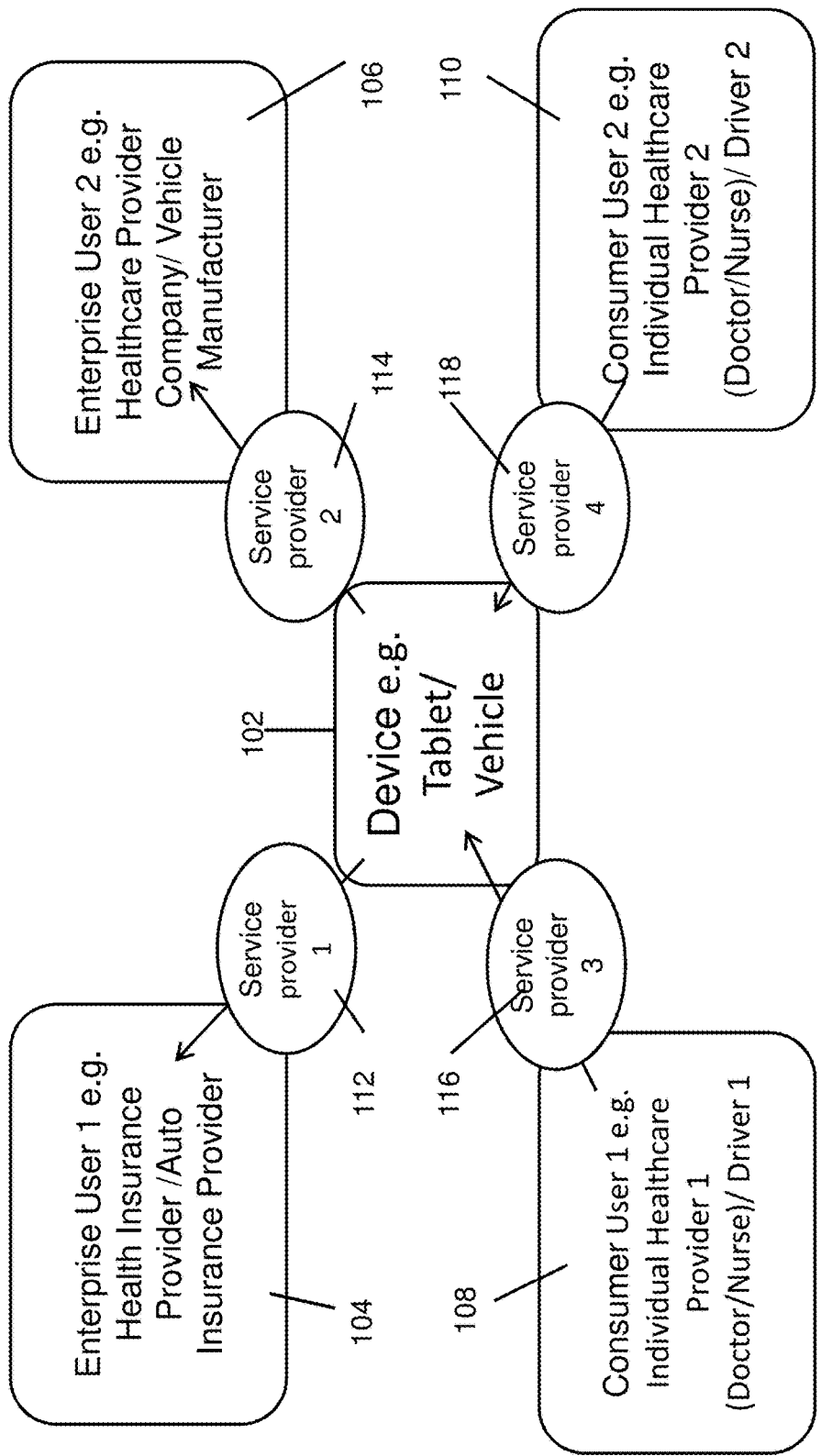

The present invention relates generally to wireless services and more particularly to devices enabled for connectivity to cellular or other wireless service and having more than one primary purpose and user. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A multi-purpose device can be defined as a device which can be used for more than one purpose by one or more users where the purposes and the users benefiting from the use may or may not be related to each other. In an embodiment, a multi-purpose device communicates with a cellular or other wireless service provider for one of its purposes to benefit one of its users and is capable of receiving and transmitting information over the provider's network. In addition, the device can be used for another purpose benefiting the same or a different user also involving communication with the same or a different provider of cellular or other wireless services. The device could be an embedded mobile device such as a telematics unit in a vehicle, a tablet, a portable computer or any portable device that has multiple purposes requiring the use of a cellular or other wireless network, either generally or in a closed environment (such as a hospital, office building or hotel).

In an embodiment, the multi-purpose device may be a mobile phone, for example, a smartphone, or a communication device enabled for connectivity via a wireless or cellular network. In an embodiment, the multi-purpose device has at least two users, e.g., a consumer user (a consumer stakeholder) and an enterprise user (an enterprise stakeholder).

In an exemplary embodiment, the multi-purpose embedded device may be a telematics control unit (TCU) in a vehicle that includes a data transmission unit capable of communicating over a cellular or other wireless network which includes the Embedded Universal Integrated Circuit Card (eUICC or eSIM). For the purpose of this document, any reference to eSIMs is considered to be referring to eUICCs. The multi-purpose embedded device, e.g., the telematics control unit (TCU) in a vehicle may be manufactured with this embedded eUICC (eSIM). The eSIM includes a pre-allocated MNO as an initial profile or a "bootstrap" profile, which is generally for a mobile network operator (MNO) or a cellular or other wireless network service provider with global connectivity. This initial profile is manufactured with the eUICC. The TCU may thus have an associated hardware identifier such as an International Mobile Equipment Identifier (IMEI) and eUICC ID (eID), and the profile may include information such as an Integrated Circuit Card Identifier (ICCID) and International Mobile Subscriber Identity (IMSI).

Once the vehicle is manufactured and released for the transport, the initial or bootstrap profile is activated on the mobile network of the pre-allocated mobile network operator (MNO) with a local rate plan. This initial profile is also assigned a Mobile Station International Subscriber Directory Number (MSISDN).

The data transmission unit, e.g., a radio module, in the multi-purpose device, e.g., OCU/TCU, may be capable of communicating over 3G or 3G/4G network, and is able to set up at least two data sessions simultaneously using different APNs. In most cases, there will be one session for usage of interest to one user, e.g., consumer traffic, e.g., infotainment, which is of interest to the consumer user and another session for usage of interest to another user, e.g., M2M traffic, which may be of interest to the enterprise user, e.g., original equipment manufacturer (OEM) or a third party application provider. These two data sessions generally may belong to the network operated by a single mobile network operator or a cellular or other wireless network service provider.

A person skilled in the art may readily recognize that more than two data sessions may be made available and hence may be used with technological advancements and other networks such as 5G or better may be utilized by the data transmission units for network communications.

As discussed above, after the vehicle is manufactured, at some point the transmission unit in the multi-purpose device, e.g., the radio module in the telematics control unit of the vehicle, is activated. The vehicle can now communicate with the OEM or other third party application providers' back end system, via the telematics control unit (OCU/TCU). The OEM or other third party application providers' back end system may include any one or more of: connectivity, user authentication, service subscription based on certain services, remote operations and collection of performance information from the vehicle (telematics).

Once the vehicle is registered with the OEM or other third party application providers back end system, the OEM or other third party application providers back end system downloads a new MNO profile called the "default" profile to the eSIM that will be used to carry traffic associated with the user (consumer or OEM) services. The default profile may be defined as a profile chosen by the OEM to conduct normal business for that particular vehicle. The backend then instructs the eSIM to activate the default profile via over the air subscription management, and automatically disables the initial or bootstrap profile. Until the default profile is activated, no traffic other than handshake traffic is allowed.

Note that the initial or bootstrap profile remains on the eSIM, but once the default profile is activated, the initial or bootstrap profile becomes dormant. At any time in the future the backend or OEM can instruct the eSIM to enable the initial or bootstrap profile via over the air subscription management, which causes the currently enabled profile which may be a default profile to be deleted or made dormant from the eSIM. An exemplary process describing over the air subscription management is illustrated in FIGS. 6e and 6f.

The choice of the default profile is up to the OEM (car manufacturer), and may or may not coincide with the consumer's personal mobile network carrier.

While on the default profile, the APN assigned for M2M traffic, e.g., APN1, is used for data traffic of interest to the OEM and is billed by the MNO or the cellular or other wireless network provider to the OEM. Additionally or alternatively, the owner of the vehicle (consumer) may enable or use data services of interest to the consumer provided by the telematics unit in the vehicle, e.g., a WiFi hotspot. Data traffic created by the use of data services of interest to the consumer uses the APN assigned for data traffic of interest to the consumer, e.g., APN2. The data traffic on the APN assigned for data traffic of interest to the consumer is billed by the MNO or the cellular or other wireless network provider to the consumer. Alternatively, data traffic of interest to the consumer may be billed by the MNO or the cellular or other network provider to the OEM, who may choose to bill the consumer. These consumer data packages may be provided for free or may be sold on a prepaid basis. For example, $10 for 10 GB expiring after 30 days.

Additionally or alternatively, the user may choose a mobile network carrier for the vehicle of their choice for free or for a fee. In such a scenario, the OEM or other third party application providers' back end system orchestrates the download of a profile for the mobile network carrier the consumer has selected to the eSIM embedded within the vehicle, and activates it via over the air subscription management. Once activated, the new profile may perform the same function as the original default profile. The original default profile may be deleted from the eSIM when this occurs, but the initial profile or the bootstrap profile remains.

Yet another option offered to the consumer user may be to pair their vehicle's data usage charges to their personal cell phone account as an additional line. This is called Pair the Plan. To do this, the consumer must provide their connectivity information including mobile network carrier name, and some kind of identifier for their personal cell phone account which is usually their cell phone number (MSISDN) to the OEM or third party application provider. This information may be collected from any one or more of: a web portal, a mobile app, and the vehicle's built in display (Head Unit). The OEM or other third party application providers' back end system then may need to perform an operation to first switch cellular network provider of the device to the consumer's MNO using the connectivity information provided by the consumer. The OEM or third party application provider may then instruct the consumer's MNO to bill data traffic on the consumer channel, which is the APN assigned to carry consumer traffic, to the indicated consumer billing account for the service provider chosen and paired by the consumer for that device. Alternatively, the OEM or third party application provider may also instruct the consumer's MNO to bill data traffic on the OEM channel, which is the APN assigned to carry OEM traffic, to the indicated consumer billing account for the service provider chosen and paired by the consumer for that device.

In an embodiment, the data traffic on the OEM/third party data channel, which is the APN assigned to carry OEM/third party data traffic, may be billed to the OEM/third party billing account for the service provider chosen by the OEM for that device.

At any given point in time there is at least one and potentially more than one profiles on the eSIM, e.g., the initial profile or the bootstrap profile and the currently active MNO profile. There may be use cases where the OEM may want to "fall back" to the initial or bootstrap profile. For example, in case of loss of connection through the new chosen and paired MNO, or suspension or termination of the consumer's billing account with the new chosen and paired MNO. If the OEM or other third party application providers back end system commands the eSIM to do this, it will disable the previously active MNO profile and enable the initial profile or the bootstrap profile again, or alternately download another profile (from the same or different MNO) to the eSIM and enable this downloaded profile.

The embodiments recited herein use the above mentioned process to carry out the operations described in the description of those embodiments.

In an embodiment, a multi-purpose device has an enterprise user (an enterprise stakeholder) and a consumer user (a consumer stakeholder). The multi-purpose device utilizes a particular cellular or other wireless provider for enterprise applications and purposes and such usage is controlled and billed by the rules of the billing plan that the enterprise user has with the provider chosen by the enterprise user. Notwithstanding this association between the device and the provider and billing subscription of the enterprise user, the device can also be paired with a subscription and billing plan available to the consumer through a provider chosen by the consumer when used for applications and purposes selected by the consumer. For these consumer-oriented uses, the multi-purpose device could be enrolled in the same billing plan (or in a new billing plan), and billed in the same manner, as any other cellular or wireless device used by that consumer and have access to one or more services (such as voice, data or SMS) available from the provider chosen by the consumer and supported by the consumer's subscription and the technical capabilities of the device. These services can be used to access such consumer-oriented uses as voice calls, messaging and address books and other data services as well as infotainment (content or programming that combines information-based uses with entertainment), whether available generally to all wireless-enabled devices or using specialized hardware/software products and systems which are built into, or can be added to, devices, for example vehicle systems designed to enhance the user experience. The cellular or wireless provider selected by the enterprise user and the consumer user may be the same or different.

Notwithstanding this association between the device and the provider and billing subscription of the consumer user, the device can also be paired with a subscription and billing plan available to the enterprise user through a provider chosen by the enterprise user when used for applications and purposes selected by the enterprise user. For these enterprise-oriented uses, the multi-purpose device could be enrolled in the same billing plan of the consumer user (or in a new billing plan), and billed in a manner chosen by the consumer user and have access to one or more services (such as voice, data or SMS) available from the provider chosen by the consumer and supported by the consumer user's subscription and the technical capabilities of the device. These services can be used to access such enterprise-oriented uses, whether available generally to all wireless-enabled devices or using specialized hardware/software products and systems which are built into, or can be added to, devices, for example vehicles designed to enhance the user experience.

Thus, in an embodiment, the enterprise user, irrespective of its initial cellular subscription and associated billing plan and/or a cellular provider may choose to use consumer user's cellular subscription and associated billing plan for its purpose of interest, essentially by piggybacking on or making further use of the consumer user's chosen cellular provider for providing the cellular subscription and associated billing plan. This usage may be achieved by providing an identifier of the device that consumer owns/uses, for example, a smartphone, for which the consumer has a cellular service provider subscription with an associated billing plan, to the enterprise user, wherein the enterprise user pairs its device, for example, a vehicle, with the consumer user's cellular subscription and associated billing plan.

In another example, a multi-purpose device could be provided by a hospital, office building, manufacturing plant, hotel, or other provider for a particular business need such as health monitoring, but could also be used to allow the current user to access other content. In each case described, a single device has more than one purpose and more than one user or stakeholder. Stakeholders can be enterprises or consumers.

The cellular subscription described herein refers to a billing account of a user and pricing associated with it, which may be based on a contract between a cellular service user and/or a subscriber, whether an enterprise user or a consumer user and the cellular service provider also known as a cellular service billing entity. The billing plan associated with the cellular subscription refers to a rate plan associated with the multi-purpose device, for example, a smartphone or a vehicle, provided by the cellular service provider.

FIGS. 1a, 1b and 1c illustrate different embodiments where a device such as a vehicle's telematics unit or a tablet reader is enrolled in one or more billing plans chosen by one or more enterprises and, at the same time, is enrolled in one or more billing plans chosen by one or more consumers where the billing plans chosen by the consumers and enterprises can be same or different.

FIG. 1a illustrates an embodiment where a device such as a vehicle's telematics unit or a tablet reader is enrolled in one or more billing plans chosen by one or more enterprises and, at the same time, is enrolled in one or more billing plans chosen by one or more consumers. Enterprise1 104 is an enterprise stakeholder such as an automobile insurance provider interested in tracking driving habits of one or more drivers. Enterprise1 104 enrolls device 102 in the service provider subscription plan 112 selected by enterprise1 104.

Similarly, enterprise2 106, another enterprise stakeholder, such as a vehicle OEM interested in tracking vehicle and vehicle systems performance, enrolls device 102 in the service provider subscription plan 114 selected by enterprise2 106. When consumer) 108, as a consumer stakeholder, uses device 102 for his/her own purpose such as infotainment, he/she would like to use his/her own subscription plan 116. Hence, consumer1 108 would enroll device 102 in the service provider subscription plan 116 selected by consumer1 108. Similarly, when consumer2 110, as another consumer stakeholder, uses device 102 for his/her own purpose such as infotainment, he/she would like to use his/her own subscription plan 118. Hence, consumer2 110 would enroll device 102 in the service provider subscription plan 118 selected by consumer2 110. This process is described in detail in U.S. Pat. No. 9,667,806.

As shown in FIG. 1b, additionally or alternatively, once the consumer1 108 enrolls device 102 in the service provider subscription plan 112 selected by consumer1 108, the enterprise1 104 and/or enterprise2 106 may enroll device 102 in the same service provider subscription plan 112 selected by consumer1 108. Similarly, once the consumer2 110 enrolls device 102 in the service provider subscription plan 112 selected by consumer1 108, the enterprise1 104 and/or enterprise2 106 may also enroll device 102 in the same service provider subscription plan 112 selected by consumer1 108. This embodiment where the consumer and enterprise users use the same service provider is illustrated by FIG. 1b.

As shown in FIG. 1c, additionally or alternatively, once the consumer1 108 enrolls device 102 in the service provider subscription plan 112 selected by consumer1 108, the enterprise1 104 and/or enterprise2 106 may enroll device 102 in the same service provider subscription plan 112 selected by consumer1 108. Similarly, once the consumer2 110 enrolls device 102 in the service provider subscription plan 114 selected by consumer2 118, the enterprise1 104 and/or enterprise2 106 may enroll device 102 in the same service provider subscription plan 114 selected by consumer2 118, when eSIM technology allows more than one profile to be active at the same time. This combination of the consumer and enterprise users using same or different service providers are illustrated by FIG. 1c.

Additionally or alternatively, if future eSIM/eUICC technology allows more than two profiles to be active at the same time, the embodiment as described in FIG. 1 may also be possible via over the air subscription management.

In the embodiments illustrated in FIGS. 1b and 1c, when the pairing occurs, the enterprise user, for example, original equipment manufacturer (OEM) moves over to the consumer cellular service provider, also known as mobile network operator (MNO). In that case, the eSIM may still have two MNO profiles on it, but only one is really active since all usage is being rated according to the consumer's cellular subscription and associated billing plan. The other profile may be the default, or the "bootstrap" profile, of the OEM's original MNO, which may be different or, by coincidence, be the same. The bootstrap profile may be kept alive but dormant (and there may be billing from the MNO associated with that) so that if the consumer plan is terminated for whatever reason (e.g., non-payment), the activity can move over to the plan associated with the other profile and may be billed according to the other user's e.g., enterprise user's, cellular subscription and associated billing plan. The "bootstrap" profile and the "default" profile as used in herein is described in detail above.

Although there are many environments in which use of a multi-purpose device would be advantageous, a significant use case is the automotive industry. Typically, in an automotive environment, a telematics unit within a vehicle (often "under the hood" and not visible to the person operating the vehicle) is used for communication. Automotive OEMs or manufacturers of vehicle audio systems often allow for the audio device in the vehicle to be connected, or paired, with the smart phone or other cellular-connected device (the "brought in phone", or BIP) of the consumer, such as vehicle owner or other user (a lessee of the vehicle or a passenger in the vehicle) as a way to economically provide infotainment services such as streaming audio in the vehicle, bypassing the telematics unit and ensuring that the cost of use remains with the consumer.

The BIP solution requires complex pairing of the smartphone with the vehicle devices and systems. For pairing to work at all, the BIP must be connected to the vehicle devices, so both BIP and vehicle devices must support compatible connectivity methods. For the consumer services to work correctly in a specific driving session, the BIP must be present and have sufficient battery, and the pairing must be refreshed, which does not always happen automatically. In addition, there is no standardization about where the system controls for the consumer services will be presented (on a screen on the vehicle device or on the screen of the BIP), which can lead to difficulties in operation and distracted driving issues. Furthermore, the BIP and the vehicle systems must support compatible infotainment application software. These capabilities must work across the range of consumer device manufacturers, operating systems, and applications. Finally, since vehicles typically have lifespans of ten years or more, the vehicle device must be able to pair with BIP devices that do not exist today or at the time of the design of the vehicle's systems, but will exist at a date sometime in the future. In practice, it is documented that consumers who upgrade smartphones and other connected devices frequently experience issues pairing their BIP devices with vehicle devices. Compatibility issues and difficulty of use drive consumer and safety complaints about most BIP systems.

Vehicle original equipment manufacturers (OEMs) are increasingly including embedded cellular connectivity in vehicles for the purposes of monitoring and managing the vehicle and its component systems. While these systems could be configured to allow use for consumer-oriented services, and consumers would want to use the embedded connectivity if it were available, and the OEM or the consumer may want to pay for the cellular connectivity used for the other party's purposes (monitoring and managing the vehicle and its component systems for the OEM, infotainment or other "front seat" services for the consumer) if unlimited data plans were available through their own subscription and billing plans.

Alternatively, neither the OEM nor the consumers may want to pay for the cellular connectivity used for the other party's purposes (monitoring and managing the vehicle and its component systems for the OEM and infotainment or other "front seat" services for the consumer).

What is needed is a method for bypassing the BIP solution and allowing the consumer to use their existing cellular data plan with the automotive embedded device for consumer-oriented services and allowing enterprise to use their enterprise oriented services, for example, under the hood services with either their own cellular data plan or making further use of the consumer's existing cellular data plan. Such an invention will save total cost, improve service, safety and consumer satisfaction, reduce complexities arising out of technological change and simplify billing.

Allowing an embedded telematics device to be used for the purposes of the consumer and for the consumer to pay for that use according to consumer's own subscription plan is currently not possible because current technology requires that the embedded device be assigned to a single subscriber plan and wireless network, in this case the subscriber plan of the OEM and the OEM's cellular home network. These limitations are eliminated by the present invention, which addresses the mutual desires of OEMs and consumers to provide a safe, convenient way to enable dual use while assigning costs to the appropriate party through their own subscription plans or through other party's subscription plan.

To describe the features of the present invention in more detail within the context of the automotive industry, refer to the accompanying figures in conjunction with the following discussions. These examples are used for purpose of illustration only, and should not be construed as limitations.

Figure 2:
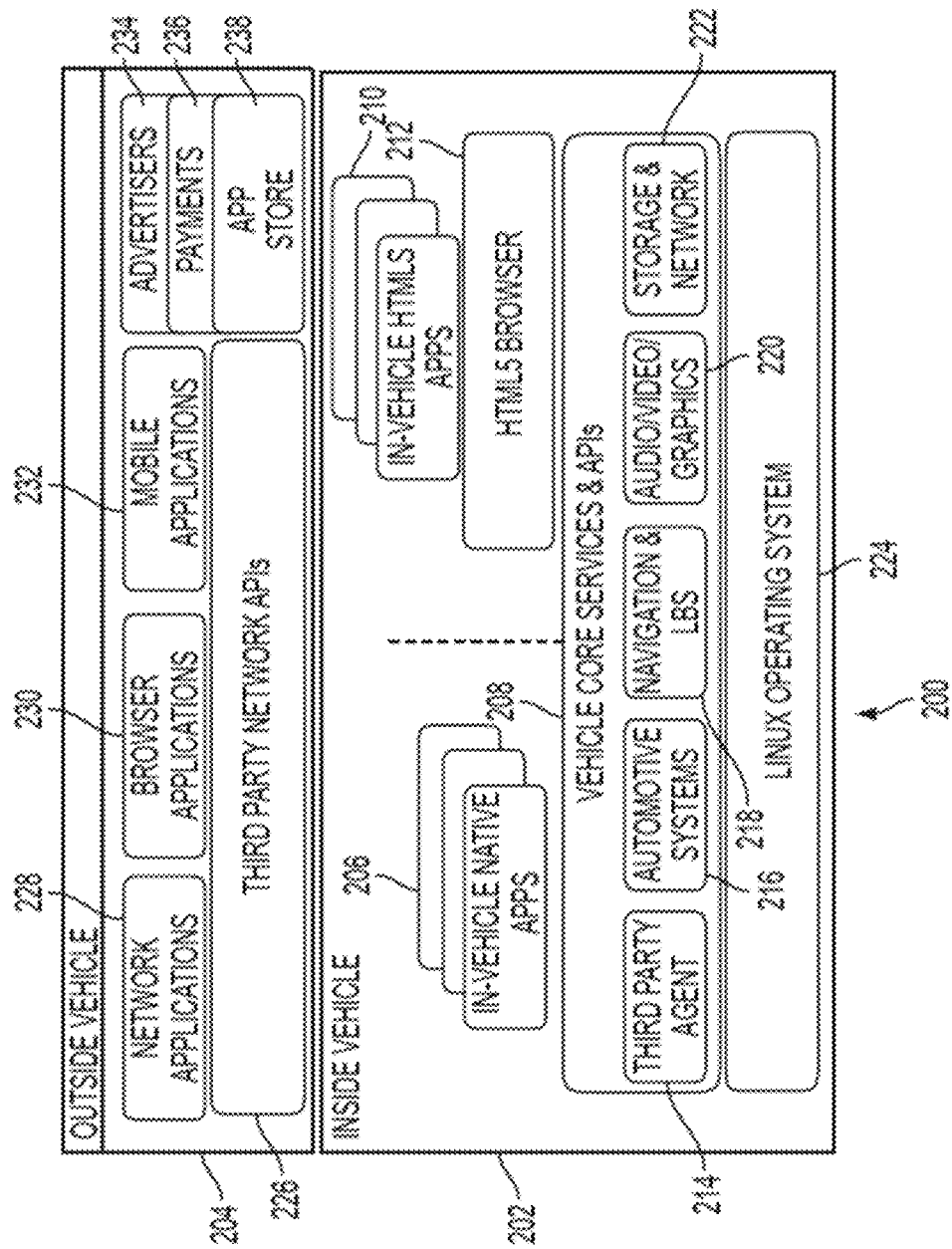
FIG. 2 illustrates a vehicle environment relating to a device with multiple purposes in accordance with an embodiment.

FIG. 2 is a diagram that illustrates applications and interfaces inside the vehicle 202 and outside the vehicle 204. Inside the vehicle comprise the applications that are running inside the vehicle. There are a variety of elements inside the vehicle that can be accessed through the applications running inside the vehicle. They include but are not limited to an operating system, for example a Linux-based operating system 224. In-vehicle native applications 206, in-vehicle Hyper Text Markup Language (HTML) applications 210 and its associated HTML browser 212, vehicle core service elements 208 all may also reside within the vehicle. The vehicle core elements could for example in an embodiment include a third party agent, 214, automotive systems 216, a navigation system 218, an audio graphic system 220 and storage and network elements 222.

Outside of the vehicle are network application programming interfaces (APIs) that reside outside the vehicle. FIG. 2 illustrates outside the vehicle applications, for example, third party network APIs 226 that interface with network applications 228, browser applications 230 and mobile applications 232. There are also advertisers 234, payment 236 and an application store 238.

These elements are utilized together to allow the vehicle OEM to choose a cellular network provider to act as interface between the vehicle OEM and the vehicle. This cellular network provider is referred to as "the OEM's carrier."

Figure 3A:
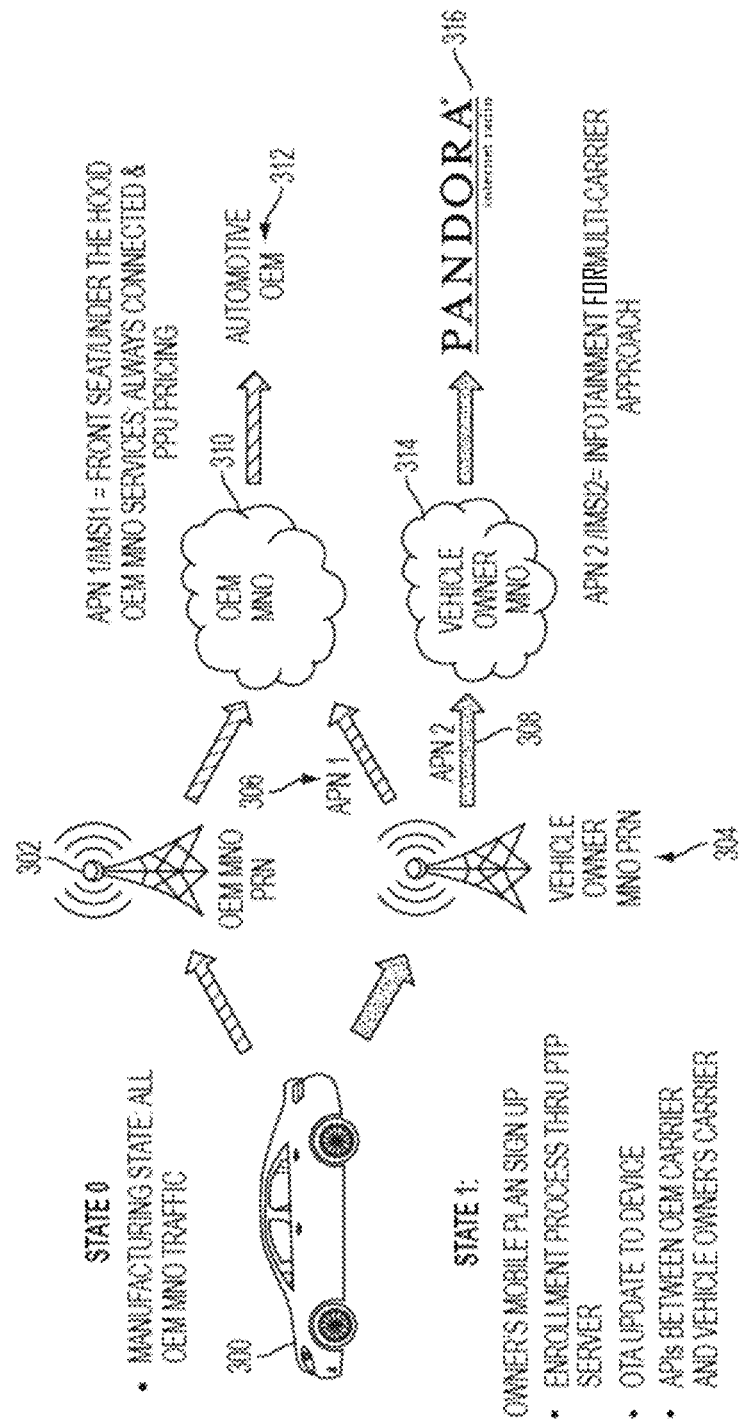

FIG. 3a is a diagram illustrating a system in which a device (in this case, a vehicle) would operate in accordance with an embodiment. The vehicle OEM 312 is always connected to the vehicle 300 via the OEM's carrier 302 which may be a "bootstrap" carrier or a "default" carrier, in a manufacturing state, state0. When the vehicle 300 is purchased, a consumer, in this case owner of the vehicle, can enroll his or her vehicle 300 into his/her existing cellular plan as provided by his/her cellular network provider referred to as "the vehicle owner's carrier" 304.

After enrollment, as depicted by state1, the vehicle's behavior is changed so that 1) the vehicle 300 will connect to the consumer's carrier depicted by vehicle owner's mobile network operator's preferred radio network (vehicle owner MNO PRN) 304 rather than the OEM's carrier 302; and 2) two network traffic paths are established, one for the OEM's purposes, the other for the vehicle owner's. The first network traffic path is depicted by Access Point Name1 (APN1) 306. This path is directed to the OEM via the vehicle owner's carrier's radio access network (vehicle owner MNO) 304 and the OEM's carrier's core network 310 to the vehicle manufacturer 312.

The interconnection between the vehicle owner's carrier 304 and the OEM's carrier 302 adheres to cellular network providers' interconnection standards. As a result, the vehicle OEM 312 is always connected to the vehicle 300. The second network traffic path is depicted by Access Point Name 2 (APN2) 308 provided to the vehicle owner's carrier 314 to access other, typically infotainment, services 316. Applications in the vehicle 300 can be mapped to either APN1 306 to allow billing directly to OEM's plan or to APN2 308 for billing to the vehicle owner's plan, depending on which stakeholder uses the application.

The embodiment described above involves use of two different subscription and associated billing plans by the consumer user and the enterprise user. However, the consumer user and the enterprise user may also use the same subscription and billing plan, according to another embodiment, as depicted by FIG. 3*b*.

The implementation depicted in FIG. 3*a* involves the management and updating of the multi-purpose device's network parameters and resources such as the International Mobile Subscriber Identifier (IMSI) or Mobile Directory Number (MDN), and the device Preferred Roaming List (PRL) or public land mobile network (PLMN). For example, the vehicle owner's carrier 304 may assign a new international mobile subscriber identifier (IMSI) to the vehicle. The new IMSI assigned by the vehicle owner's carrier will be used for all future authentications and dataflow, and old IMSI assigned by the OEM's carrier 302 remains as a back-up for vehicle OEM to access the vehicle related data in case of loss of connection through the new carrier or suspension or termination of the vehicle owner's account with the new carrier.

The HLR or HSS 310 of the OEM's carrier 302 may be utilized, as an embodiment, to manage the network registrations and authorizations post-pairing as discussed in description accompanying FIGS. 4*a* and 4*b*, 4*b* and 4*c*.

FIG. 3*b* is a diagram illustrating a system in which a device (in this case, a vehicle) would operate in accordance with another embodiment. The vehicle OEM 312' may be connected to the vehicle 300' via the OEM's carrier 302' in a manufacturing state, state0. As illustrated in FIG. 3*b*, the vehicle in state 0 has one International Mobile Subscriber Identifier (IMSI), IMSI1 assigned to it with one APN. APN 1 306' to allow traffic pertaining to front seat/under the hood services and/or applications. When the vehicle 300' is purchased, a consumer, in this case owner of the vehicle, can enroll his or her vehicle 300' into his/her existing cellular plan as provided by his/her cellular network provider referred to as "the vehicle owner's carrier" 304'.

After enrollment, as depicted by state1, the vehicle's behavior is changed so that 1) the vehicle 300' will connect to the consumer's carrier depicted by vehicle owner's mobile network operator's preferred radio network (vehicle owner MNO PRN) 304' rather than the OEM's carrier 302', and the consumer's carrier will now assign another IMSI, IMSI 2 to the vehicle; and 2) two network traffic paths are established, one for the OEM's purposes, the other for the vehicle owner's, both traffic paths now using IMSI 2. The first network traffic path is depicted by Access Point Name2 (APN2) 308'. This path is directed to the OEM via the vehicle owner's carrier's radio access network (vehicle owner MNO) 304' and the vehicle owner's service provider's (carrier's) core network 314' to the vehicle manufacturer 312'.

The second network traffic path in state 1, is depicted by Access Point Name 3 (APN3) 318 provided to the vehicle owner's carrier 314' to access other, typically infotainment, services 316'. Applications in the vehicle 300' can be mapped to either APN1 306' to allow billing directly to OEM's plan, corresponding to IMSI 1, which may be kept alive as a bootstrap profile if the consumer plan is terminated for whatever reason, e.g., non-payment, or to APN2 308' and/or APN3 318 for billing to the vehicle owner's plan, depending on which stakeholder uses the application.

The implementation depicted in FIG. 3B involves the management and updating of the multi-purpose device's network parameters and resources such as the International Mobile Subscriber Identifier (IMSI) or Mobile Directory Number (MDN), and the device Preferred Roaming List (PRL) or public land mobile network (PLMN) as described above. For example, the vehicle owner's carrier 304' may assign a new international mobile subscriber identifier (IMSI) IMSI 2 to the vehicle. The new IMSI, IMSI 2, assigned by the vehicle owner's carrier will be used for all future authentications and dataflow, and old IMSI, IMSI 1, assigned by the OEM's carrier 302' remains as a back-up for vehicle OEM to access the vehicle related data in case of loss of connection through the new carrier or suspension or termination of the vehicle owner's account with the new carrier.

The HLR or HSS 310' of the OEM's carrier 302' may or may not be utilized, as an embodiment, to manage the network registrations and authorizations post-pairing as discussed below.

FIGS. 4*a* and 4*b* illustrate management of network registrations and authorizations through different channels of communication post-pairing. FIG. 4*a* illustrates a preferred embodiment where HSS/HLR is maintained by the "Pair The Plan" PTP host MNO 406 even after pairing, for example, authentication and location updates are done with PTP host MNO 406. This is accomplished by the vehicle owner MNO 408 redirecting the authentication and location update traffic toward the PTP host MNO 406 based on the IMSI. This continuing involvement of PTP host MNO 406 in managing data traffic provides various advantages such as maintaining any special features that the automotive OEM 410 requires to execute functionalities of interest to it and better enabling additional and/or subsequent pairings. FIG. 4*b* illustrates another embodiment where management of network registrations and authorizations is transferred to the vehicle owner MNO 408' from PTP host MNO 406' post-pairing, for example, authentication and location updates are accomplished using vehicle owner MNO 408'.

To describe an example of a pairing experience by both the consumer and the cellular plan provider in accordance with an embodiment refer now to the following description in conjunction with the accompanying figures.

FIG. 5 illustrates a series of display screens depicting an example of a pairing experience by the consumer, in accordance with an embodiment of the invention. Initially, the consumer will go to a "Vehicle Subscription Pairing" screen 502 accessible via user settings. The consumer must enter an identification number, for example, a phone number of the primary device, typically a smartphone, associated with his/her cellular subscription using a keypad or other input system similar to that on screen 504. An application based on a server or in the cloud will be triggered that will use the entered phone number to identify the consumer's cellular network provider and subscription. Once the plan is identified, the eligibility of the subscription plan to support pairing with the vehicle is verified. If eligible, a request requiring verification that the consumer approves adding the vehicle to their identified plan as a new device is sent to the consumer. In this embodiment, the verification process is entering an activation code on screen 506.

After successful verification by the consumer, a request is sent to the consumer's cellular network provider to obtain new values of network resources for the vehicle's telematics unit. These resources include, but are not limited to, the IMSI, Mobile Subscriber Integrated Services Digital Network-Number (MSISDN), and the APN to be used as APN2 308 in FIG. 3.

Thereafter the consumer's cellular network provider will respond to the request with new resource values. An over-the-air update to the vehicle is performed applying the resource values obtained from the consumer's carrier. A confirmation text is then sent to the consumer's smartphone. Upon completion, additional message(s) may be provided confirming that pairing has completed and/or reporting any pairing errors as shown by screen 508 and screen 510.

FIG. 6a is a flow diagram illustrating the process of pairing the vehicle to the billing plan of the consumer's cellular subscription, in accordance with an embodiment of the invention. The consumer's cellular network provider is referred to as "Cellular Provider" or "MNO" 608 and the server or cloud-based application used for pairing is referred to as the "PTP server" 604.

First, a request for pairing is initiated by the consumer through vehicle TCU 602 or by the vehicle TCU 602 to the PTP server 604 via step 610. This initiation could be provided in a variety of ways. For example, one, by providing either an MSISDN of a cellular device 606 of the vehicle owner and thus identifying MNO based on MSISDN, or two, by providing an MNO of the cellular device 606 of the consumer. Next, the PTP server 604 sends a signal to the cellular provider 608 to determine if the cellular device 606 is eligible for vehicle pairing by the cellular plan provider 608, by utilizing for example the MSISDN, via step 612. If it is determined that the cellular device 606 is eligible, then a monthly cost may be provided to the PTP server 604 via step 614 and sent to the vehicle 602, via back end systems 603 via steps 614' and 614". Next, a text is provided to the cellular device to prevent fraud and make sure the user actually has possession of the cellular device, via step 616. This message may be initiated by the PTP server as shown by 616 or the cellular plan provider directly as shown by 616'. The text may say for example "Request has been made to pair vehicle XYZ with your VZN mobile plan at cost of $10/month. If you wish to accept pairing, press <here>. We will then send you an activation code to complete this transaction." Upon receipt of the approval, the cellular plan provider may send an additional text to indicate completion of the enrollment process, saying, for example, "Your activation code is: 12345". Alternatively, the initial text message may also include the required activation code. Next, the consumer would enter the activation code, via step 618, to finish the pairing activities by the consumer. The activation code entered by the consumer is provided to the PTP server 604 via back end systems 603 via steps 618' and 618" which is verified by the PTP server 604 via step 619. If the activation code is provided by the MNO, the PTP server can check the activation code with the MNO to verify the activation code. If the vehicle is equipped with eUICC and it is not already on consumer's mobile carrier, the vehicle is moved onto consumer's mobile carrier via subscription management, for example, by using over the air subscription management as illustrated in FIGS. 6e and 6f. Using the ICCID obtained from this process, the subscription is activated with cellular provider/MNO 608 to obtain IMSI and MSISDN and optionally APN. New subscription on the eUICC is activated and TCU APN is updated via step 620.

Once the activation code is verified, pairing is activated, for example, by using the MSISDN provided by the consumer in step 610 and the IMSI/MSISDN of the vehicle, via step 621. The MNO may also optionally choose to request confirmation of the pairing request from the consumer at this point via text message or phone call prior to pairing via step 622 and 623. The MNO confirms pairing via step 624 and the PTP Server confirms via step 625. Pairing success may then be confirmed by vehicle, via step 626. Finally, the vehicle screen will display pairing success to the owner of the cellular device, via step 627 and a text is received by the cellular device that indicates that the vehicle has been paired, via step 628. Thereafter, the cellular device used to perform the pairing is not required to be present in the vehicle for the consumer-oriented services to be usable.

Figure 6B:
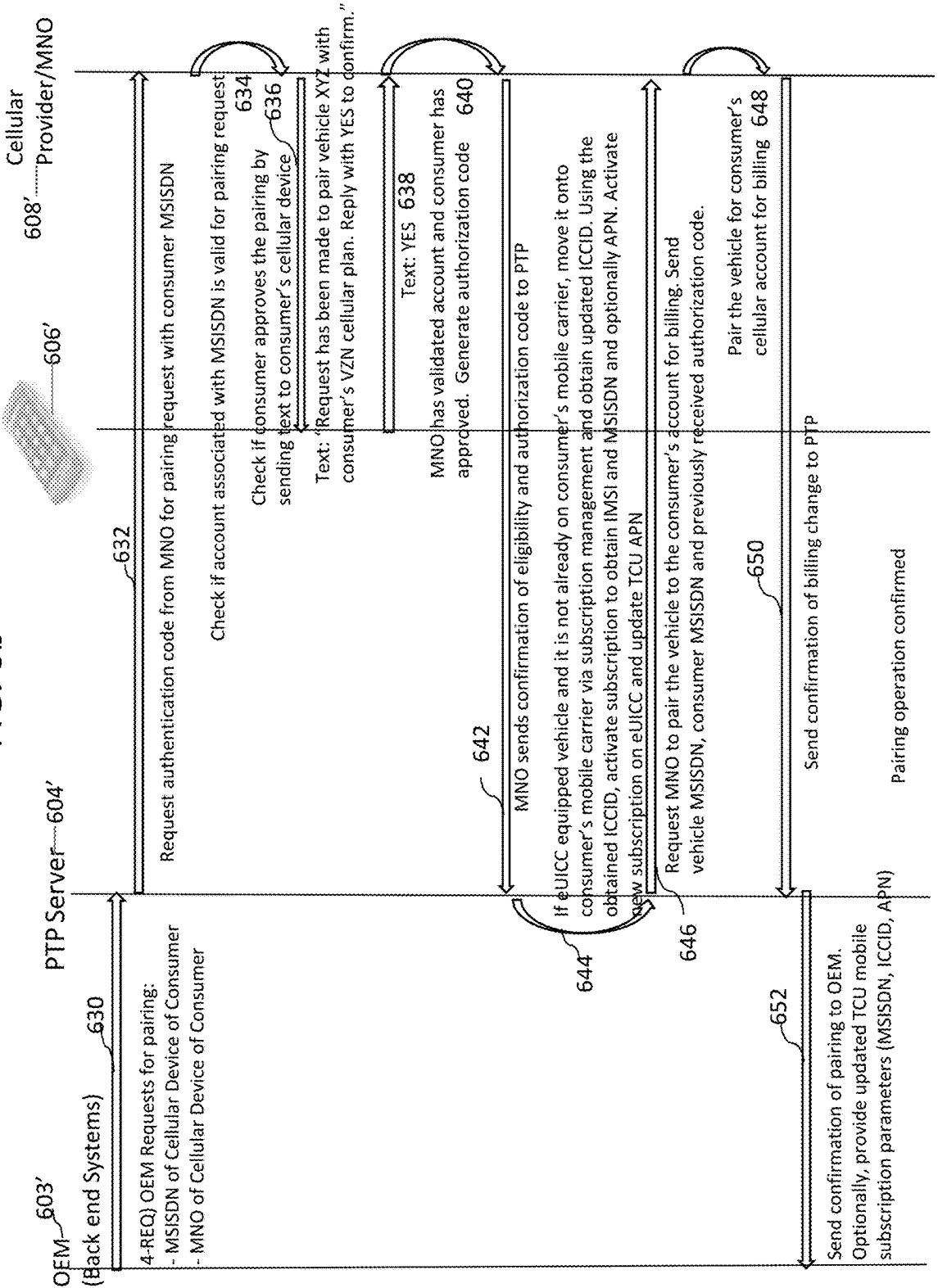
FIG. 6b is a flow diagram illustrating the process of pairing the network usage for OEM related applications running on the vehicle to the billing plan of the consumer's cellular subscription, in accordance with an embodiment of the invention.

FIG. 6b is a flow diagram illustrating an exemplary embodiment describing the process of pairing the network usage for OEM related applications running on the vehicle to the billing plan of the consumer's cellular subscription, in accordance with an embodiment of the invention. The consumer's cellular network provider is referred to as "Cellular Provider," 608' and the server or cloud-based application is referred to as the "PTP server" 604'.

In an embodiment illustrated by FIG. 6b, once the vehicle has been paired with the consumer's cellular subscription and associated billing plan, the enterprise user, for example, OEM, may want to use the consumer's billing plan for applications of the OEM's interest, for example, under the hood applications, rather than using enterprise user's separate billing plan. This may be done by providing MSISDN of cellular device 606' of consumer or vehicle owner and thus identifying MNO based on MSISDN, or two, by providing an MNO of cellular device 606' of consumer by the OEM 602' (or OEM back end system) to the PTP server 604' via step 630 as it initiates a request for pairing OEM related applications for that vehicle to the consumer's billing plan to which the vehicle has been paired earlier as shown in FIG. 6a. The pairing may encompass usage by the enterprise user and/or by the consumer user such that the vehicle related use by the enterprise user and/or by the consumer user is billed to the consumer's billing and subscription plan.

The PTP server 604' requests authentication code from MNO or cellular service provider 608' for pairing request with consumer MSISDN via step 632. The cellular service provider 608' checks if the account associated with the MSISDN provided by the OEM 602' is valid for pairing request via step 634. The cellular service provider 608' also checks if consumer approves the pairing by sending text to consumer's cellular device 606' via step 636. The consumer through their cellular device 606' may approve the pairing request by responding "YES" via step 638. Once the MNO or cellular service provider 608' has validated account and consumer has approved, it generates authorization code via step 640 and sends confirmation of eligibility and authorization code to PTP server 604' via step 642.

The PTP server 604' checks if the vehicle is eUICC equipped. If the vehicle is equipped with eUICC and it is not already on consumer's mobile carrier, the vehicle is moved onto consumer's mobile carrier via subscription management, e.g., use the same cellular provider or MNO, for example, by using over the air subscription management as illustrated in FIGS. 6e and 6f. Using the obtained ICCID, subscription is activated with cellular provider/MNO 608' to obtain IMSI and MSISDN and optionally APN. New subscription on eUICC is activated and TCU APN is updated via step 644. Thus, the eUICC and APN used by vehicle TCU is updated by this process. The PTP server 604' then requests MNO or cellular service provider 608' to pair the vehicle to the consumer's account for billing and sends vehicle MSISDN and/or IMSI, consumer MSISDN and/or IMSI and previously received authorization code via step 646. The MNO or cellular service provider 608' pairs the vehicle for consumer's cellular account for billing via step 648 and sends confirmation of billing change to PTP server 604' via step 650. The PTP server 604' also sends confirmation of pairing to OEM, or optionally, provide updated TCU mobile subscription parameters (MSISDN, ICCID, APN) via step 652 and confirms the completion of the pairing operation.

Figure 6C:
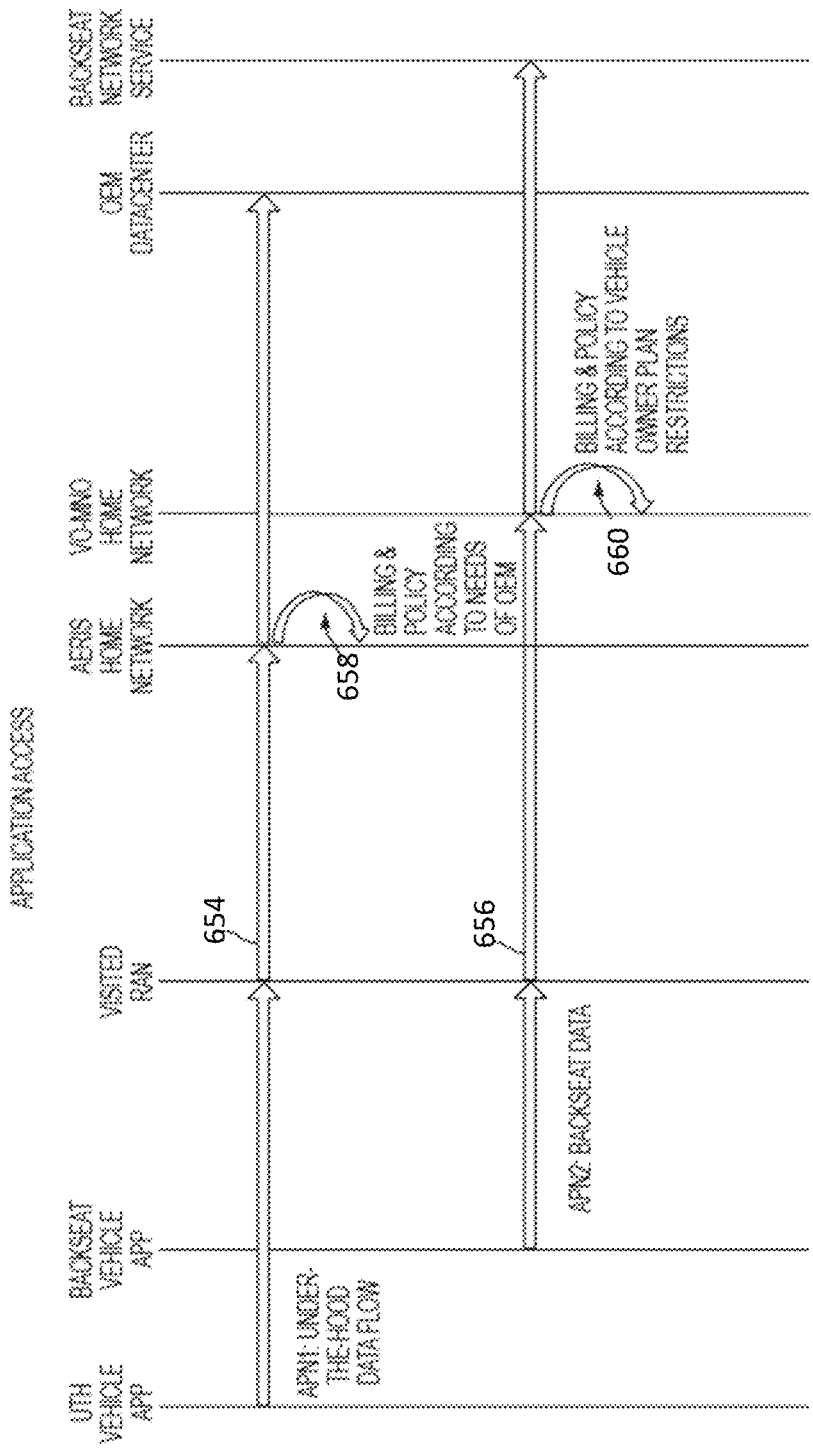
FIGS. 6c and 6d illustrate the transmittal of information to and from the paired vehicle device through two corresponding network traffic paths identified by the access point name (APN).

FIG. 6c illustrates the transmittal of information to and from the paired vehicle device through two corresponding network traffic paths identified by the access point name (APN). Each path manages and charges for traffic according to the policies and the billing plan selected by corresponding stakeholder. For example, as shown in FIG. 6c, APN1 provides under-the-hood and other driving-related data to the OEM step 654 and APN2 provides consumer-directed infotainment or other services to the consumer step 656.

Since the OEM is interested in monitoring under-the-hood and other driving-related data, the OEM will be charged for network traffic associated with transmitting this data, according to its billing plan step 658. Similarly, since the consumer is interested in receiving infotainment or other consumer-directed services and associated content, the consumer will be charged for traffic associated with these consumer-directed applications according to the rules and policies of the consumer's cellular subscription and associated billing plan step 660.

Figure 6D:
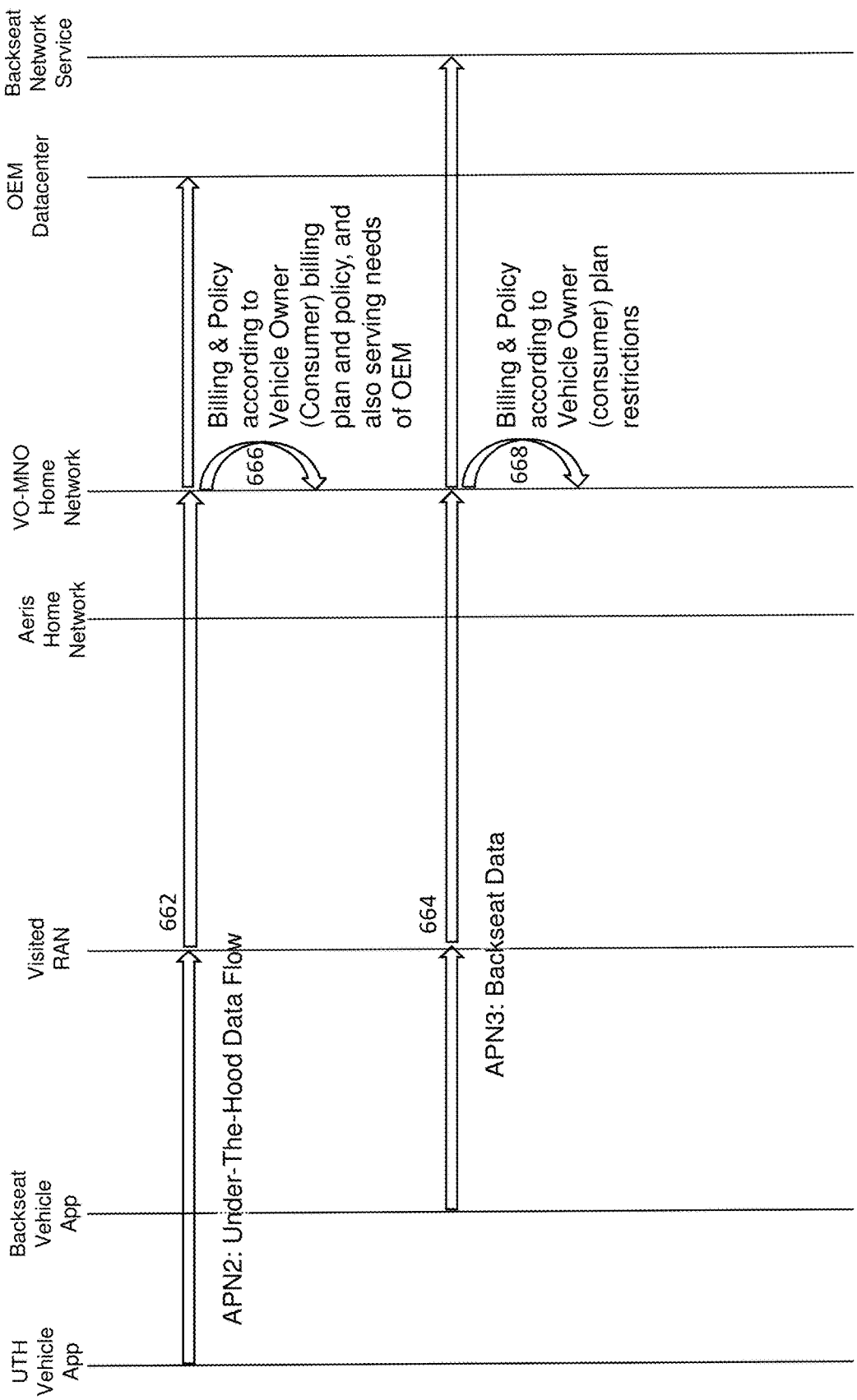
Figure 6E:
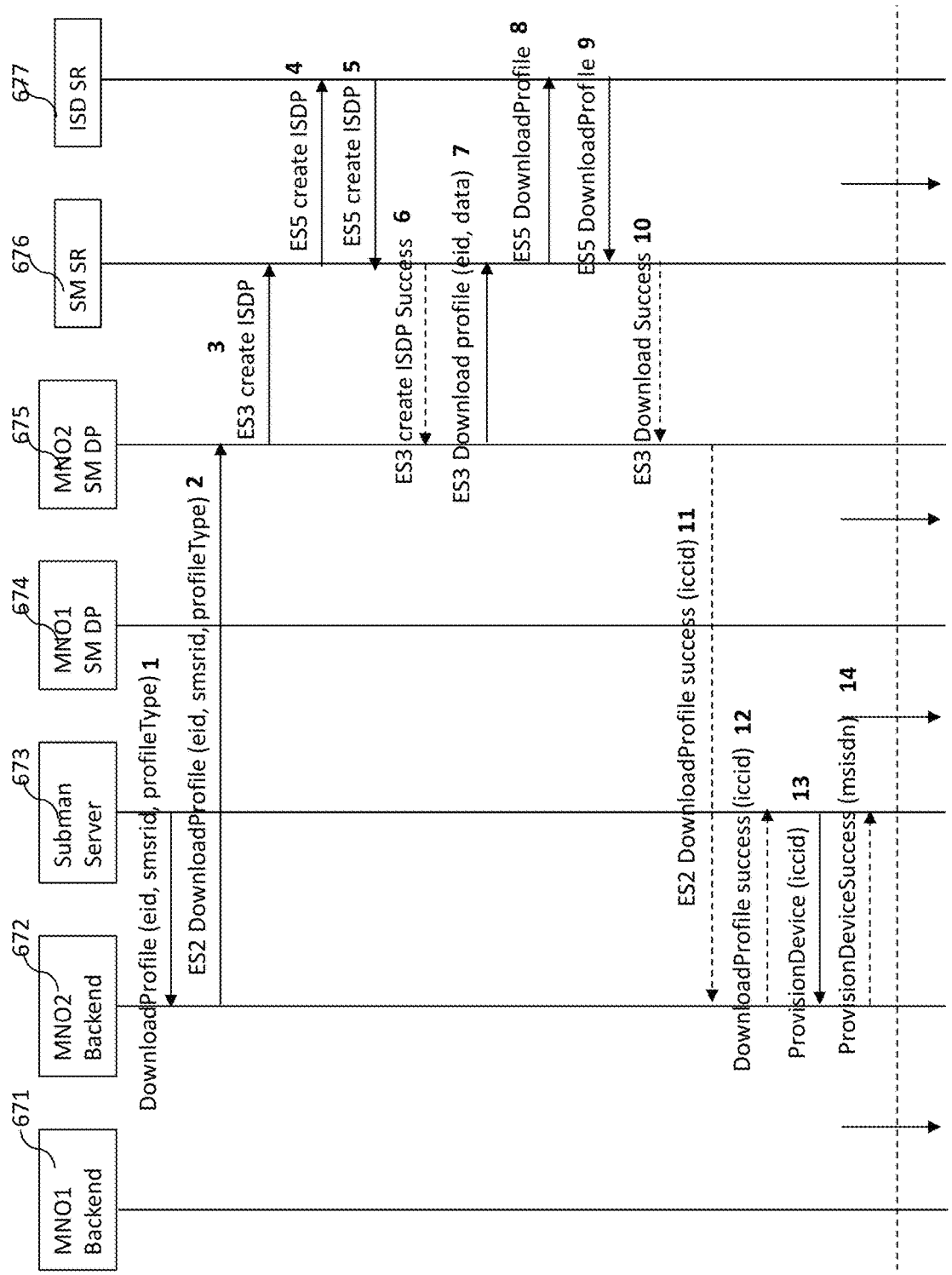

FIG. 6d illustrates the transmittal of information to and from the paired vehicle device through two corresponding network traffic paths identified by the access point name (APN). Each path manages and charges for traffic according to the policies and the billing plan selected by corresponding stakeholder. For example, as shown in FIG. 6d, APN2 provides under-the-hood and other driving-related data to the OEM step 662 and APN3 provides consumer-directed infotainment or other services to the consumer step 664.

Since the OEM is interested in monitoring under-the-hood and other driving-related data, and the OEM has successfully paired his vehicle application usage data with consumer's cellular billing plan the consumer may be charged for network traffic associated with transmitting this data, according to vehicle owner's billing plan step 666. Similarly, since the consumer is interested in receiving infotainment or other consumer-directed services and associated content, the consumer will be charged for traffic associated with these consumer-directed applications according to the rules and policies of the consumer's cellular subscription and associated billing plan step 668.

FIGS. 6e and 6f illustrate an exemplary process for over the air subscription management. The MNO for a device may be changed from MNO 1 to MNO 2 (or from one MNO to another MNO), via over the air subscription management as follows. The subscription management described herein downloads and enables new profile as desired. The system used for subscription management for two mobile network operators (MNOs) may include MNO 1 backend 671, MNO 2 backend 672, subscription management server 673, MNO 1 subscription manager data preparation (SM DP) 674, MNO 2 subscription manager data preparation (SM DP) 675, subscription manager secure routing (SM SR) 676 and Issuer Security Domain Secure Routing (ISD SR) 677. ES2, ES3, ES4 and ES5 as used herein refer to defined interfaces between specific components of the system. For example, ES2 is defined as an MNO-SM_DP interface and is related to profile download and installation procedure. ES3 is defined as SM_DP-SM_R interface and is related to profile download and installation procedure. ES4 is defined as an MNO-SM_SR interface and is related to profile download and installation procedure. ES5 is defined as an SMSR-eUICC interface and is a secure channel interface established between SM_SR and ISD R used for over the air communication for remote provisioning and management.

Subscription management server 673 downloads profile for MNO 2 including Embedded Universal Integrated Circuit Card Identifier (EID), Subscription Manager Secure Routing Identifier (SMSRID) and profile type via step 1. MNO 2 backend 672 requests download of the profile to MNO 2 SM DP 675 via step 2 which requests creation of Issuer Security Domain Profile (IS DP) from SM SR 676 via step 3. SM SR 676 uses ES5 to create ISDP at ISD SR via step 4. Once the ISDP is successfully created, it is transmitted to the MNO 2 SM-DP 675 and the profile is downloaded to the eUICC. The profile may include information such as an Integrated Circuit Card Identifier (ICCID) and International Mobile Subscriber Identity (IMSI). This profile for MNO 2 is assigned a Mobile Station International Subscriber Directory Number (MSISDN) via steps 13 and 14.

The subscription management server 673 requests to update UICC information for the device with eUICC including EID, ICCID, MSISDN to SM SR 676. This may be done by using ES4 which may involve a single step 15 or ES2 which may involve two steps 16 and 17. Once the profile on SM SR is updated via step 15 or 17, it is enabled via steps 18, 19, 20, 21, 22 and the success may be reported via steps 23, 24 and 25 to all the entities involved in the transaction. As the new profile for MNO 2 is enabled, MNO1 is notified that the original profile is disabled via step 24.

Figure 7A:
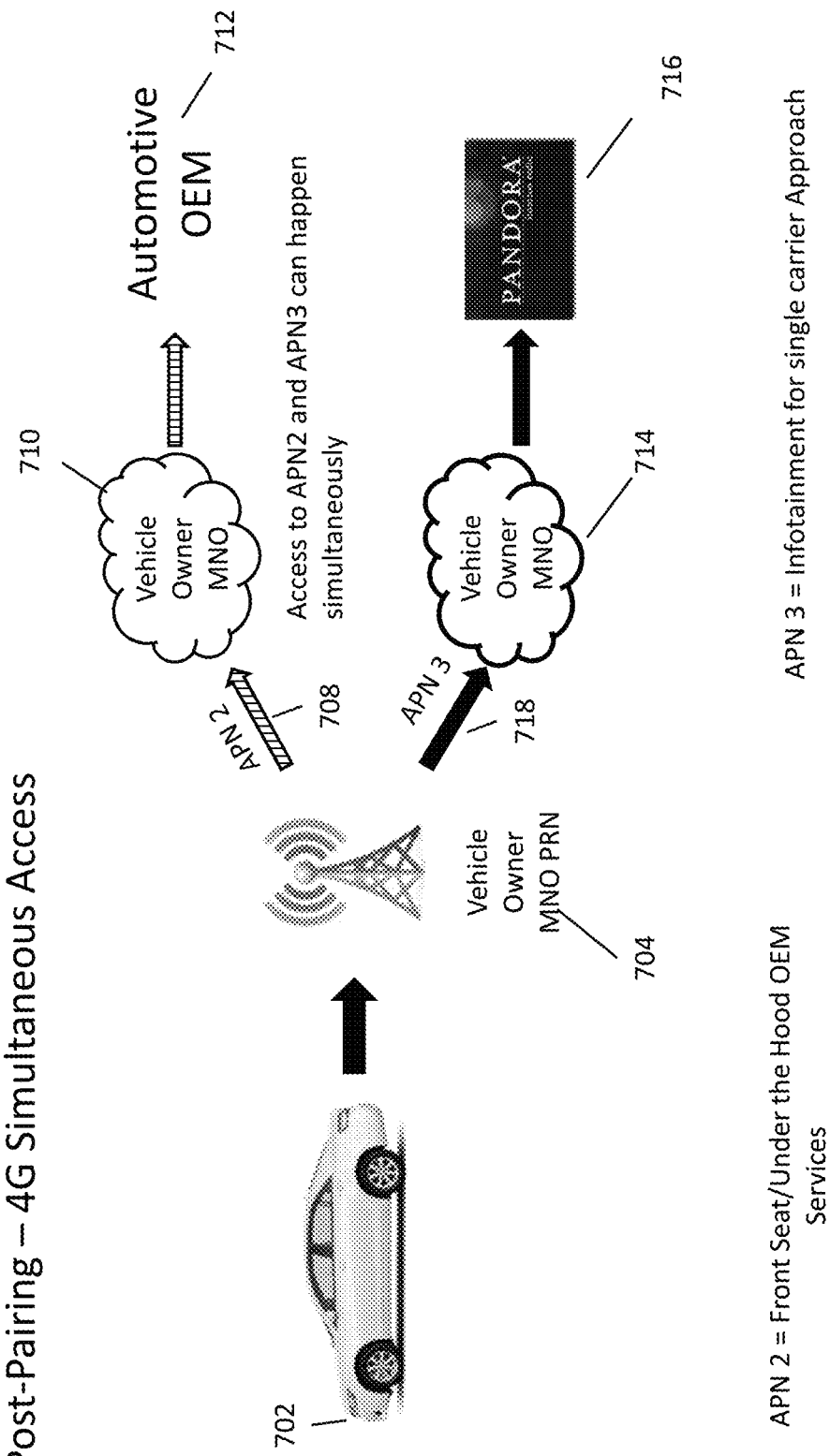
FIG. 7a illustrates a way in which a device being used for enterprise and consumer purposes simultaneously may access same provider networks, in this case through use of different access point names (APN2 and APN3) via a fourth generation (4G) cellular systems network.

FIG. 7a illustrates simultaneous access through APN2 and APN3 via a first cellular network system, for example, a fourth generation (4G) network. The simultaneous access through both APN2 708 and APN3 718 is possible due to the presence and simultaneous availability of two data paths in a 4G network system, identified by APNs 708 and 718 (APN2 and APN3).

FIG. 7b illustrates alternate access through APN2 and APN3 via a second cellular network system, for example, a third generation (3G) network. In a 3G network system, only one data path is accessible at a time, so the vehicle 702' must be able to alternate between the two data paths identified by APN2 708' and APN3 718' according to the priorities and requirements of the supported applications. Different algorithms can be used for determination of APN access by the vehicle during different situations. For example, the algorithm could specify "if the vehicle is not in "ignition/aux on" then use APN2; if the vehicle is in "ignition/aux on" then use APN3. The use of this algorithm can result in the OEM accessing its under-the-hood data via APN2 708' when the vehicle 702' is not being used by the consumer, and the consumer accessing its applications and data via APN3 718'. This arrangement generally works well since many OEM uses for data are not time-specific, allowing OEM 712' to upload its under-the-hood data just after the vehicle 702' is turned off. However, the system can be configured to grant priority to non-consumer uses in specified situations, such as in case of emergency; for example, the system can immediately grant access to emergency communication, such as an automatic call to 911 regarding an accident, by switching to APN2 708' and terminating communications over APN3 718 for the duration of the emergency call.

However, in an embodiment, a multicarrier approach as illustrated in FIG. 3b and described in detail in the description accompanying FIG. 3b is also possible where the OEM may have choice to use either APN1 via OEM MNO or APN2 via vehicle owner/consumer MNO in state 1.

Alternatively or additionally, 3G may also offer two data paths simultaneously similar to 4G. Alternatively or additionally, 5G may also offer two data paths simultaneously similar to 4G.

Figure 8:
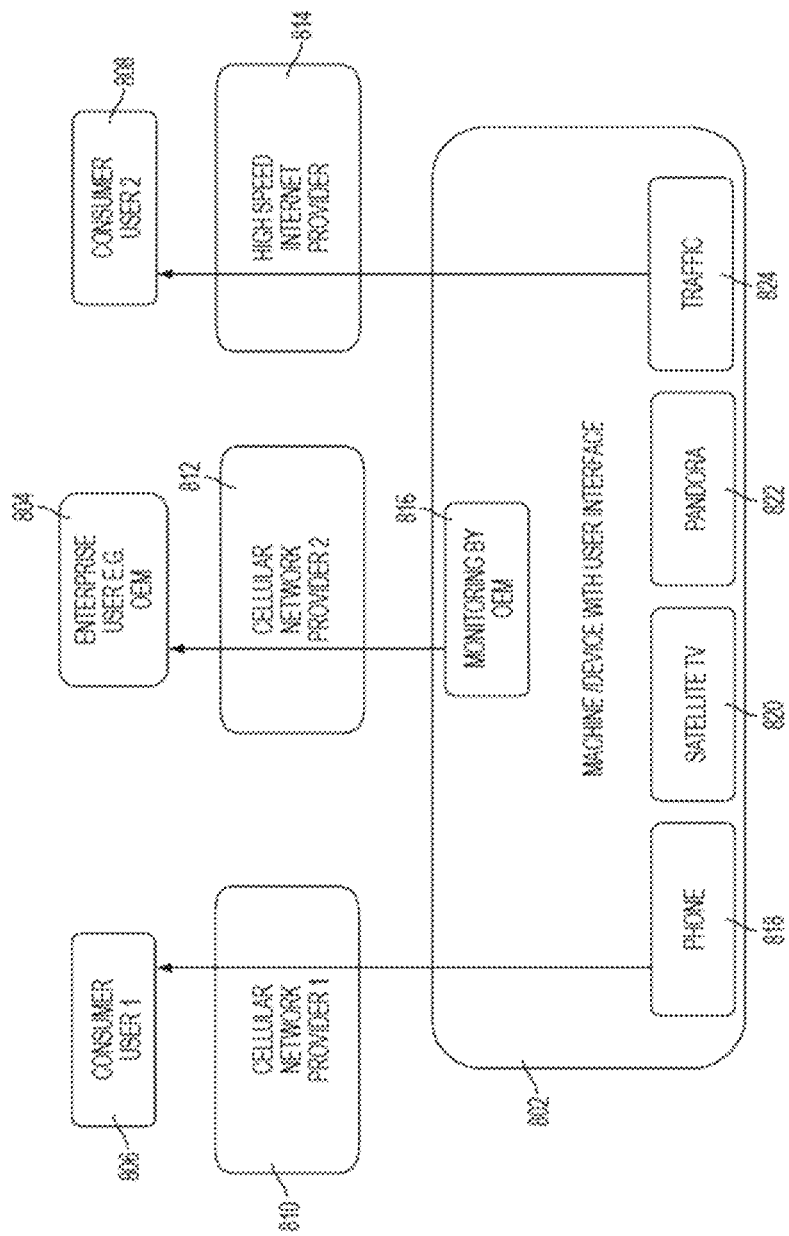
FIG. 8 illustrates an example of an interface for use/purpose based billing for multipurpose devices connected to one or more service providers providing different data services to different users based on usage of communication channels in accordance with an embodiment.

FIG. 8 illustrates another embodiment where, in independent transactions, a device such as a tablet or a vehicle is enrolled in one or more billing plans chosen by one or more enterprise stakeholders and also in one or more billing plans chosen by one or more consumers, such as but not limited to an owner, user or a lessee of the tablet or the vehicle. Device 802 can be any device such as but not limited to a tablet or a vehicle with a user interface for example, as described in FIG. 5. Enrolling the device 802 in different subscription plans as selected by different users, which can be any combination of one or more enterprises and/or consumers, is carried out as described in FIG. 6a. In an embodiment, the device may be enrolled in the same subscription plan as the consumer user and may make further use of his associated billing plan as illustrated in FIGS. 6c and 6d and described in description associated with FIGS. 6c and 6d. Examples used are for purpose of illustration only, and should not be construed as limitations.

As illustrated in FIG. 8, OEM 804 is an enterprise that is interested in monitoring equipment performance 816, enrolls device 802 in the service provider subscription plan 812 selected by OEM 804. Consumer1 806 and consumer2 808 are different users of the same device 802 who, in addition to using the device for its principal purposes (e.g. in case of vehicle, driving), would also use the device 802 for other purposes such as infotainment depicted by phone 818, satellite TV 820, Pandora 822 and traffic 824. When consumer1 806 uses the device 802 for his/her own purpose such as infotainment, he/she would use his/her own subscription plan. Consumer1 806 enrolls device 802 in the service provider subscription plan 810 selected by consumer1 806. Similarly, when consumer2 808 uses the device 802 for his/her own purpose such as infotainment, he/she would use his/her own subscription plan.

Consumer2 808 enrolls device 802 in the service provider subscription plan 814 selected by consumer2 808. Furthermore, consumer1 806 and consumer2 808 can choose which channel to use to get the content based on their service provider subscription plan. For example, applications available through different communication channels, consumer can choose which communication channel to use e.g. YouTube through cellular network as a communication channel is more expensive than internet as a communication channel.

Alternatively or additionally, in an embodiment, the OEM may choose to use either consumer1 or consumer2's billing plan and use the MNO of their choice for applications of interest to the enterprise user, and the consumer whose plan the OEM selects may get charged for the usage and the usage may be restricted according to the consumer's billing plan selected.

FIG. 9 illustrates a data processing system 900 suitable for storing the computer program product and/or executing program code in accordance with an embodiment of the present invention. The data processing system 900 includes a processor 902 coupled to memory elements 904a-b through a system bus 906. In other embodiments, the data processing system 900 may include more than one processor and each processor may be coupled directly or indirectly to one or more memory elements through a system bus.

Memory elements 904a-b can include local memory employed during actual execution of the program code, bulk storage, and cache memories that provide temporary storage of at least some program code in order to reduce the number of times the code must be retrieved from bulk storage during execution. As shown, input/output or I/O devices 908a-b (including, but not limited to, keyboards, displays, pointing devices, etc.) are coupled to the data processing system 900. I/O devices 908a-b may be coupled to the data processing system 900 directly or indirectly through intervening I/O controllers (not shown).

In FIG. 9, a network adapter 910 is coupled to the data processing system 902 to enable data processing system 902 to become coupled to other data processing systems or remote printers or storage devices through communication link 912. Communication link 912 can be a private or public network. Modems, cable modems, and Ethernet cards are just a few of the currently available types of network adapters.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include digital versatile disk (DVD), compact disk-read-only memory (CD-ROM), and compact disk-read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

As used herein the terms device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

Similarly, it is envisioned by the present invention that the term communications network includes communications across a network (such as that of a M2M but not limited thereto) using one or more communication architectures, methods, and networks, including but not limited to: Code Division Multiple Access (COMA), Global System for Mobile Communications (GSM) ("GSM" is a trademark of the GSM Association), Universal Mobile Telecommunications System (UMTS), Long Term Evolution (LTE), fourth generation cellular systems (4G) LTE, 5G, wireless local area network (WLAN), and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer-implemented method comprising:
    enrolling a second device enabled for connectivity to cellular or other wireless service in a cellular subscription and associated billing plan associated with a first device owned by a second user,
        wherein the enrollment includes providing an identifier for the second device to a cellular service provider associated with the first device by the second user, effectively adding the second device to the cellular subscription and associated billing plan associated with the first device; and
    allowing the second user to use capabilities of the second device as governed by the cellular subscription and an associated billing plan associated with the first device; while the second device is also configured to allow a first user to use capabilities of the second device as governed by the cellular subscription and an associated billing plan of the first user's choice,
        wherein the second device is a multipurpose device shared simultaneously by the first user and the second user, and
        wherein the first user is an enterprise user and the capabilities of the second device of interest to the first user comprise machine to machine (M2M) traffic, and
        wherein the second user is a consumer user and the capabilities of the second device of interest to the second user comprise consumer traffic.

2. The computer-implemented method of claim 1, wherein the cellular subscription and an associated billing plan of the first user's choice includes the same cellular subscription and the associated billing plan associated with the first device or a different cellular subscription and an associated billing plan.

3. The computer-implemented method of claim 1 further comprising:
    managing data flow through one or more data paths according to usage requirements of the first user and the second user.

4. The computer-implemented method of claim 1 further comprising:
    managing data flow through one or more data paths according to connectivity parameters controlled by the cellular service provider and the enabled device, and according to usage requirements of the first user and the second user.

5. The computer-implemented method of claim 1 further comprising:
    managing data flow through one or more data paths according to connectivity parameters controlled by the cellular service provider and the enabled device and according to usage requirements by the first user and the second user, and allowing emergency access to emergency related data-flow to and from the enabled device by overriding data-flow management configuration under non-emergency situation.

6. The computer-implemented method of claim 1, wherein the device identifier comprises any of international mobile subscriber identification (IMSI), mobile directory number (MDN), mobile subscriber integrated services digital network number (MSISDN), integrated circuit card identifier (ICCID), embedded universal integrated circuit card identifier (EID) and a combination thereof.

7. The computer-implemented method of claim 1, wherein enrolling a second device enabled for connectivity to cellular or other wireless service in a cellular subscription and associated billing plan associated with a first device further comprises using over the air subscription management.

8. The computer-implemented method of claim 1, wherein configuring the enabled device for use by a first user via the same cellular subscription and the associated billing plan selected by the second user includes providing device identifier of the second device to the cellular service provider selected by the second user for pairing usage of the second device to the cellular subscription and associated billing plan selected by the second user.

9. A system comprising a first device, a second device and a cellular service provider enrollment server enabled for enrollment of one or more devices, the server including a processor and a memory in communication with the processor, wherein the server
    receives an identifier for the second device to the cellular service provider associated with the first device, effectively adding the second device to the cellular subscription and associated billing plan associated with the first device owned by a second user, and
    enrolls the second device enabled for connectivity to cellular or other wireless service in a cellular subscription and associated billing plan associated with a first device;
        wherein the second user is allowed to use capabilities of the second device as governed by the cellular subscription and an associated billing plan associated with the first device; and
        wherein the second device is also configured to allow a first user to use capabilities of the second device as governed by the cellular subscription and an associated billing plan of the first user's choice, and wherein the second device is a multipurpose device shared simultaneously by the first user and the second user, and wherein the first user is an enterprise user and the capabilities of the second device of interest to the first user comprise machine to machine (M2M) traffic, and wherein the second user is a consumer user and the capabilities of the second device of interest to the second user comprise consumer traffic.

10. The system of claim 9, wherein the cellular subscription and an associated billing plan of the first user's choice includes the same cellular subscription and the associated billing plan associated with the first device or a different cellular subscription and an associated billing plan.

11. The system of claim 9, wherein data flow through one or more data paths is managed according to usage requirements by the first user and the second user.

12. The system of claim 9, wherein data flow through one or more data paths is managed according to connectivity parameters controlled by the cellular service provider and the enabled device, and according to usage requirements by the first user and the second user.

13. The system of claim 9, wherein the data flow through one or more data paths is managed according to connectivity parameters controlled by the cellular service provider and the enabled device and according to usage requirements by the first user and the second user, and allowing emergency access to emergency related data-flow to and from the enabled device by overriding data-flow management configuration under non-emergency situation.

14. The system of claim 9, wherein the device identifier comprises any of international mobile subscriber identification (IMSI), mobile directory number (MDN), mobile subscriber integrated services digital network number (MSISDN), integrated circuit card identifier (ICCID), embedded universal integrated circuit card identifier (EID) and a combination thereof.

15. The system of claim 9, wherein enrolling the second device enabled for connectivity to cellular or other wireless service in a cellular subscription and associated billing plan associated with a first device further comprises using over the air subscription management.

16. The system of claim 9, wherein configuring the enabled device for use by a first user via the same cellular subscription and the associated billing plan selected by the second user includes providing device identifier of the second device to the cellular service provider selected by the second user for pairing usage of the second device to the cellular subscription and associated billing plan selected by the second user.

17. A non-transitory computer-readable medium having executable instructions stored therein that, when executed, cause one or more processors corresponding to a system having a first device, a second device and a cellular service provider enrollment server enabled for enrollment of one or more devices, the server including a processor, a memory in communication with the processor and a user interface, to perform operations comprising:

enrolling a second device enabled for connectivity to cellular or other wireless service in a cellular subscription and associated billing plan associated with a first device owned by a second user, wherein the enrollment includes providing an identifier for the second device to a cellular service provider associated with the first device by the second user, effectively adding the second device to the cellular subscription and associated billing plan associated with the first device; and allowing the second user to use capabilities of the second device as governed by the cellular subscription and an associated billing plan associated with the first device; while the second device is also configured to allow a first user to use capabilities of the second device as governed by the cellular subscription and an associated billing plan of the first user's choice, wherein the second device is a multipurpose device shared simultaneously by the first user and the second user, and wherein the first user is an enterprise user and the capabilities of the second device of interest to the first user comprise machine to machine (M2M) traffic, and wherein the second user is a consumer user and the capabilities of the second device of interest to the second user comprise consumer traffic.

18. The non-transitory computer-readable medium of claim 17, wherein the cellular subscription and an associated billing plan of the first user's choice includes the same cellular subscription and the associated billing plan associated with the first device or a different cellular subscription and an associated billing plan.

19. The non-transitory computer-readable medium of claim 17, further comprising instructions for:

managing data flow through one or more data paths according to usage requirements of the first user and the second user.

20. The non-transitory computer-readable medium of claim 17, further comprising instructions for:

managing data flow through one or more data paths according to connectivity parameters controlled by the cellular service provider and the enabled device, and according to usage requirements of the first user and the second user.

21. The non-transitory computer-readable medium of claim 17, further comprising instructions for:

managing data flow through one or more data paths according to connectivity parameters controlled by the cellular service provider and the enabled device and according to usage requirements by the first user and the second user, and allowing emergency access to emergency related data-flow to and from the enabled device by overriding data-flow management configuration under non-emergency situation.

22. The non-transitory computer-readable medium of claim 17, wherein the device identifier comprises any of international mobile subscriber identification (IMSI), mobile directory number (MDN), mobile subscriber integrated services digital network number (MSISDN), integrated circuit card identifier (ICCID), embedded universal integrated circuit card identifier (EID) and a combination thereof.

23. The non-transitory computer-readable medium of claim 17, wherein enrolling a second device enabled for connectivity to cellular or other wireless service in a cellular subscription and associated billing plan associated with a first device further comprises using over the air subscription management.

24. The non-transitory computer-readable medium of claim 17, wherein configuring the enabled device for use by a first user via the same cellular subscription and the associated billing plan selected by the second user includes providing device identifier of the second device to the cellular service provider selected by the second user for pairing usage of the second device to the cellular subscription and associated billing plan selected by the second user.

\* \* \* \* \*